(12) United States Patent
Kilari

(10) Patent No.: US 10,936,215 B2
(45) Date of Patent: Mar. 2, 2021

(54) AUTOMATED DATA QUALITY SERVICING FRAMEWORK FOR EFFICIENT UTILIZATION OF INFORMATION TECHNOLOGY RESOURCES

(71) Applicant: EMC IP Holding Company LLC, Hopkinton, MA (US)

(72) Inventor: Koteswara Rao Kilari, Hopkinton, MA (US)

(73) Assignee: EMC IP Holding Company LLC, Hopkinton, MA (US)

(*) Notice: Subject to any disclaimer, the term of this patent is extended or adjusted under 35 U.S.C. 154(b) by 27 days.

(21) Appl. No.: 15/966,816

(22) Filed: Apr. 30, 2018

(65) Prior Publication Data

US 2019/0332294 A1    Oct. 31, 2019

(51) Int. Cl.
| | | |
|---|---|---|
| *G06F 12/02* | (2006.01) | |
| *G06F 3/06* | (2006.01) | |
| *G06F 12/1009* | (2016.01) | |
| *G11C 11/56* | (2006.01) | |
| *G06F 11/07* | (2006.01) | |
| *G06F 11/10* | (2006.01) | |
| *H03M 13/09* | (2006.01) | |

(52) U.S. Cl.
CPC .......... *G06F 3/0631* (2013.01); *G06F 3/0604* (2013.01); *G06F 3/0653* (2013.01); *G06F 3/0671* (2013.01)

(58) Field of Classification Search
CPC .... G06F 3/0631; G06F 3/0604; G06F 3/0653; G06F 3/0671; G06F 3/067
See application file for complete search history.

(56) References Cited

U.S. PATENT DOCUMENTS

| 9,497,136 B1* | 11/2016 | Ramarao | G06F 9/45558 |
| 9,524,111 B1* | 12/2016 | Manden | G06F 3/0611 |
| 2007/0073602 A1* | 3/2007 | Hicks | G06Q 10/06 705/29 |

(Continued)

OTHER PUBLICATIONS

DELL EMC, "Data Quality Service for Improving Accountability and Agile Decision Making—Framework for Improving Data Quality," White Paper, Oct. 2017, 26 pages.

*Primary Examiner* — Charles Rones
*Assistant Examiner* — Tong B. Vo
(74) *Attorney, Agent, or Firm* — Ryan, Mason & Lewis, LLP

(57) ABSTRACT

A method includes determining one or more storage systems storing information technology (IT) resource utilization data, establishing a set of data quality rules for controlling storage of the IT resource utilization data in the one or more storage systems to reduce unallocated IT resource utilization, and analyzing the IT resource utilization data stored in the one or more storage systems to detect data discrepancies affecting allocation of the IT resource utilization data, adjusting the IT resource utilization data stored in one or more of the storage systems to remedy a given data discrepancy associated with the IT resource utilization data, and modifying the set of data quality rules for controlling storage of the IT resource utilization data in the one or more storage systems to prevent the given data discrepancy from occurring on subsequent storage of the IT resource utilization data in the one or more storage systems.

20 Claims, 11 Drawing Sheets

(56) References Cited

U.S. PATENT DOCUMENTS

| | | | |
|---|---|---|---|
| 2014/0280918 A1* | 9/2014 | Grandhe | G06Q 30/0631 |
| | | | 709/224 |
| 2015/0067171 A1* | 3/2015 | Yum | G06F 9/5072 |
| | | | 709/226 |
| 2016/0191343 A1* | 6/2016 | Dong | G06F 9/5083 |
| | | | 709/226 |
| 2016/0294666 A1* | 10/2016 | Xu | H04L 29/08 |
| 2016/0308783 A1* | 10/2016 | Bookman | G06F 9/5077 |
| 2017/0052814 A1* | 2/2017 | Aguiar | G06F 9/5083 |
| 2017/0104627 A1* | 4/2017 | Bender | H04L 47/765 |
| 2019/0034095 A1* | 1/2019 | Singh | G06F 12/0253 |

\* cited by examiner

AUTOMATED DATA QUALITY SERVICING FRAMEWORK FOR EFFICIENT UTILIZATION OF INFORMATION TECHNOLOGY RESOURCES

FIELD

The field relates generally to information processing, and more particularly to managing data quality.

BACKGROUND

Management of information technology (IT) infrastructure, including providing accurate measures of utilization of different IT resources in the IT infrastructure, is a difficult task. Accurate measurement of the utilization of IT resources is important for allowing consumers of IT resources to monitor and control their investments in IT services. Further, from the perspective of an entity managing IT infrastructure, the ability to accurately account for and allocate costs associated with utilization of IT resources to consumers is an important management task. Such tasks, however, are complicated in that the underlying data used for measuring and allocating utilization of IT resources is of varying quality.

SUMMARY

Illustrative embodiments of the present invention provide techniques for automated data quality servicing to provide efficient utilization of information technology resources in an information technology infrastructure.

In one embodiment, a method comprises determining one or more storage systems storing information technology (IT) resource utilization data for an IT infrastructure, establishing a set of data quality rules for controlling storage of the IT resource utilization data in the one or more storage systems to reduce unallocated IT resource utilization, analyzing the IT resource utilization data stored in the one or more storage systems to detect data discrepancies affecting allocation of the IT resource utilization data, adjusting the IT resource utilization data stored in one or more of the storage systems to remedy a given data discrepancy associated with the IT resource utilization data, and modifying the set of data quality rules for controlling storage of the IT resource utilization data in the one or more storage systems to prevent the given data discrepancy from occurring on subsequent storage of the IT resource utilization data in the one or more storage systems. The method is performed by at least one processing device comprising a processor coupled to a memory.

These and other illustrative embodiments include, without limitation, methods, apparatus, networks, systems and processor-readable storage media.

DETAILED DESCRIPTION

Figure 1:
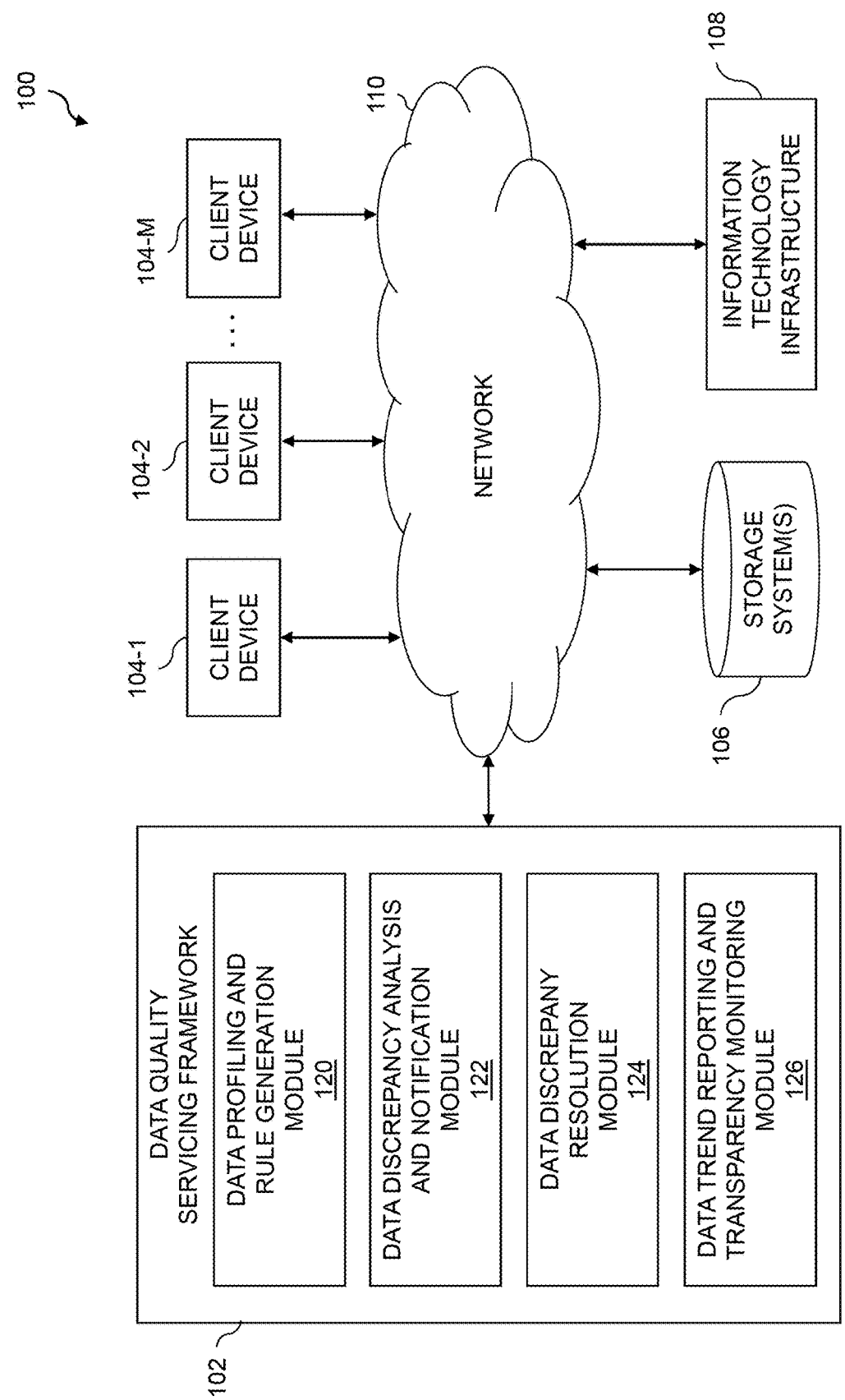
FIG. 1 is a block diagram of an information processing system for managing data quality in an illustrative embodiment of the invention.

Illustrative embodiments will be described herein with reference to exemplary information processing systems and associated computers, servers, storage devices and other processing devices. It is to be appreciated, however, that embodiments are not restricted to use with the particular illustrative system and device configurations shown. Accordingly, the term "information processing system" as used herein is intended to be broadly construed, so as to encompass, for example, processing systems comprising cloud computing and storage systems, as well as other types of processing systems comprising various combinations of physical and virtual processing resources. An information processing system may therefore comprise, for example, at least one data center or other type of cloud-based system that includes one or more clouds hosting tenants that access cloud resources.

With the rise of cloud computing and other types of on-demand computing, there is a need for information technology (IT) cost transparency. Allowing IT customers or users of IT infrastructure to view and manage utilization of IT services and resources is a critical part of transforming IT operations into an IT-as-a-Service model. Allocation of IT resource utilization, including cost allocation, however, is limited by the underlying data from which resource utilization and cost information is drawn.

One particular challenge for an IT-as-a-Service model is in providing accurate costs and measures of IT resource utilization (e.g., cost of applications, services, etc. provided using resources of an IT infrastructure). To provide accurate costs, minute details of various costs associated with providing IT products and services is needed, along with detailed information for how such costs may be allocated between particular IT product and service components and ultimately to end users of the IT products and services. To provide the necessary level of detail, good quality data is needed together with a framework and governance model for managing data quality. Data quality servicing frameworks should provide these and other features, including an ability to identify opportunities for improving data quality (e.g., based on mining data, developing processes and procedures for cleaning data in an automated way, etc.).

Data quality servicing frameworks are thus important tools for managing an IT infrastructure, permitting better accountability in managing data quality and thus improving efficiency in utilization of IT resources (e.g., compute, network and storage resources) of an IT infrastructure. Improved data quality reduces errors in decision making, and creates a path for continuous service improvement including identifying innovative ideas for improving data quality (e.g., from trend data or other reports or monitoring of the quality of IT resource utilization data). Data quality servicing frameworks may be further configured to provide notifications regarding specific data quality issues possibly in conjunction with remedial measures for fixing the specific data quality issues, thereby improving communication and collaboration between IT management, consumers, support personnel, etc. This may be especially useful for new workforces to receive information about what needs to be done for maintaining and improving data quality.

Reducing the risk involved in making data-based decisions is a goal of various entities which manage IT resource utilization and other data for an IT infrastructure. Further, there is a goal of improving agility and accountability associated with data-based decisions to transform IT into an IT-as-a-Service model to bring financial or cost transparency and other advantages for more efficient utilization of IT resources. These and other goals depend on the underlying quality of data that is used. Data quality servicing frameworks are used to maintain sustainable and reliable data quality in a system of records thus ensuring that the costs and allocation of IT resource utilization data for IT products and services are accurate. This permits better data-based decision making both within and outside an IT domain.

Embodiments described herein provide data quality servicing frameworks that provide one or more of these and other advantages and desired features, enabling techniques for exploring data quality, developing accountability for data quality, improving a system of records from which IT resource utilization data is obtained, and refining data integrity policies. In some embodiments, a data quality servicing framework provides an IT cost transparency model leveraging data quality approaches and methodologies to bring accuracy in the cost of IT resource utilization by reducing unallocated costs associated with IT resource utilization.

Data quality servicing is often an intense and tedious manual task, requiring significant manual effort which may take several weeks or longer depending on the size and complexity of underlying data associated with IT resource utilization for an IT infrastructure to provide data suitable for compiling an operational report for decision-making. IT resource utilization data is pulled from a system or systems of records, which may be on one or multiple storage systems. Data cleansing is performed, such as in local spreadsheets, and then a report is prepared. Such manual approaches, however, do not allow re-use of cleansed data as the cleaning is not happening in the system or systems of records, but is instead performed at a data consumption point. Embodiments described herein provide data quality servicing frameworks that enable data cleansing directly in the system or systems of records, reducing the duplicate effort involved with data cleansing at multiple data consumption points. This saves time and reduces the resources needed for preparing operational reports used to inform decision making.

FIG. 1 shows an information processing system 100 configured in accordance with an illustrative embodiment. The information processing system 100 is assumed to be built on at least one processing platform and provides functionality for managing data quality utilizing a data quality servicing framework 102. The data quality servicing framework 102 manages data quality of storage systems 106 that store data related to an IT infrastructure 108. The storage systems 106 may comprise one or multiple different storage systems which collectively provide a system of records for storing IT resource utilization data for the IT infrastructure 108. Although shown as separate in FIG. 1, in some embodiments at least a portion of the storage systems 106 may be part of the IT infrastructure 108 or the data quality servicing framework 102.

The storage systems 106 provide data sources that are accessed by various users or data consumers via client devices 104-1, 104-2, . . . 104-M (collectively, client devices 104). The data quality servicing framework 102, client devices 104 storage systems 106 and IT infrastructure 108 may be connected via at least one network 110.

The client devices 104 may comprise, for example, mobile telephones, laptop computers, tablet computers, desktop computers or other types of devices utilized by members of an enterprise, in any combination. Such devices are examples of what are more generally referred to herein as "processing devices." Some of these processing devices are also generally referred to herein as "computers."

The client devices 104 in some embodiments comprise respective computers associated with a particular company, organization or other enterprise. In addition, at least portions of the system 100 may also be referred to herein as collectively comprising an "enterprise." Numerous other operating scenarios involving a wide variety of different types and arrangements of processing devices are possible, as will be appreciated by those skilled in the art.

The network 110 may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

As mentioned above, the storage systems 106 may provide data sources for storing information relating to the IT infrastructure 108, such as IT resource utilization data as will be described in further detail below. The IT infrastructure 108 may include various network, compute and storage resources, including: IT hardware such as switches, routers, servers, storage systems, datacenters, etc.; and IT software such as virtual machines (VMs), containers, platforms, modules, tools, components, databases, applications, etc. IT resource utilization information for the IT hardware and software of IT infrastructure 108 may be stored in the storage systems 106. In some cases, different instances of particular IT hardware and software components may store information in different ones of the storage systems 106, or as different data sets in the storage systems 106. In some cases, multiple data sets may contain interrelated IT resource utilization data. For example, different monitoring tools or IT processes may monitor utilization of different IT resources in different ways resulting in storage of different data sets that all relate to utilization of the same underlying IT resources. As a result, there may be varying data quality across data sets stored in the storage systems 106 relating to IT resource utilization.

The data quality servicing framework 102 implements a number of functional modules for managing data quality in the storage systems 106, including data profiling and rule generation module 120, data discrepancy analysis and notification module 122, data discrepancy resolution module 124 and data trend reporting and transparency monitoring module 126.

The data profiling and rule generation module 120 is configured to profile data from a system or systems of records provided by the storage systems 106. This data profiling may be used to determine health or quality of the data. Various analytical techniques may be used to examine the data in storage systems 106 for completeness, accuracy and other characteristics relating to the health, integrity or more generally quality of the stored data. The data profiling and rule generation module 120 is further configured to develop data quality rules based on the data profiling of the data sources 106. The data quality rules may be used to control storage of IT resource utilization data in the system or systems of records provided by the storage systems 106. In some embodiments, the data quality rules are useful for bringing visibility of data needs based on how the IT resource utilization data in the storage systems 106 is utilized by different data consumers or users of the client devices 104.

The data discrepancy analysis and notification module 122 is configured to use various patterns of analysis for identifying data discrepancies (also referred to herein as data errors) in the data sources 106. Data discrepancies or data errors may take various forms. In some cases, data discrepancies occur when IT resource utilization data for a given IT resource is spread across multiple data sets (e.g., generated by different monitoring tools or IT processes or functions). Inconsistencies between such multiple data sets can lead to data errors, such as where one data set includes certain information regarding utilization of an IT resource not provided by another data set, where different data sets store conflicting data, etc. Data errors may also occur within a given data set, such as where data values are missing, out of specified ranges, etc. Multiple data sets may in some cases be compiled for use in measuring utilization of a particular IT resource. As one example, timesheet data may be used to log labor effort for servicing or maintenance of IT hardware and software resources. The timesheet data in different data sets may contain discrepancies (such as overlapping or different time periods, late submissions, duplication of labor effort data, etc.) which affects data quality that is compiled from multiple data sets. Patterns of analysis used by the data discrepancy analysis and notification module 122 may in some cases be used to develop remedial measures for improving data quality (e.g., to fix existing data discrepancies, to prevent future data discrepancies, etc.) such as through implementation of new data quality procedures such as validation checks, automated data sharing, etc.

The data discrepancy analysis and notification module 122 is also configured to generate notifications or reports of data discrepancies to appropriate IT personnel, such as data owners, data stewards, etc. This advantageously brings awareness of the data discrepancies to IT personnel having the responsibility or ability to remedy such errors.

The data discrepancy resolution module 124 is configured to resolve data discrepancies in a system or systems of records stored in the storage systems 106. In some embodiments, this includes fixing data errors at the source (e.g., at a particular one of the storage systems 106) rather than at data consumption or transfer points (e.g., between different ones of the storage systems 106, between storage systems 106 and data consumers at client devices 104, etc.). Data discrepancies may be resolved in multiple phases, such as in providing temporary solutions by implementing legacy data fixes for existing data stored in the storage systems 106, and implementing ongoing or permanent solutions to prevent future data discrepancies through modifying data quality rules which control storage of IT resource utilization data in the storage systems 106. This may involve, in some embodiments, modifying monitoring tools of other IT processes and functions which are used to gather and record information relating to IT resource utilization.

The data trend reporting and transparency monitoring module 126 is configured to keep track of data discrepancies and their resolution over time, so as to produce reports or other analysis indicating data quality trends. The data trend reporting and transparency monitoring module 126 is further configured to monitor such data trends to measure and ensure that unallocated IT resource utilization costs are reduced by improving data quality in the storage systems 106.

It is to be appreciated that the particular arrangement of the data quality servicing framework 102, client devices 104 and data storage system 106 illustrated in the FIG. 1 embodiment is presented by way of example only, and alternative arrangements can be used in other embodiments. As an example, the functionality associated with the data profiling and rule generation module 120, data discrepancy analysis and notification module 122, data discrepancy resolution module 124 and data trend reporting and transparency monitoring module 126 may in some embodiments be combined into fewer modules, or may by separated across more modules, with the multiple modules possibly being implemented with multiple distinct processors or processing devices.

At least portions of the data profiling and rule generation module 120, data discrepancy analysis and notification module 122, data discrepancy resolution module 124 and data trend reporting and transparency monitoring module 126 may be implemented at least in part in the form of software that is stored in memory and executed by a processor.

An exemplary process for automated data quality servicing utilizing the data quality servicing framework 102 will now be described in more detail with reference to the flow diagram of FIG. 2. It is to be understood that this particular process is only an example, and that additional or alternative processes for automated data quality servicing can be carried out in other embodiments.

In this embodiment, the process includes steps 200 through 208. These steps are assumed to be performed by the data quality servicing framework 102. The process begins with step 200, determining one or more storage systems storing IT resource utilization data for an IT infrastructure. In step 202, a set of data quality rules is established for controlling storage of the IT resource utilization data in the one or more storage systems to reduce unallocated IT resource utilization. The IT resource utilization data stored in the one or more storage systems is analyzed in step 204 to detect data discrepancies affecting allocation of the IT resource utilization data. In step 206, the IT resource utilization data stored in one or more of the storage systems is adjusted to remedy a given data discrepancy associated with the IT resource utilization data. The set of data quality rules for controlling storage of the IT resource utilization data in the one or more storage systems is modified in step 208 to prevent the given data discrepancy from occurring on subsequent storage of the IT resource utilization data in the one or more storage systems.

Step 202 may also include generating data profiles for one or more data domains, the data profiles characterizing quality of the data in the one or more data domains, where the set of data quality rules comprises rules governing storage of data in the one or more data domains. Generating the data profiles may comprise determining a scope of a given IT function or process, identifying data sources in the one or more storage systems utilized by the given IT function or process, determining input and output data formats for the given IT function or process, and identifying computations and associated data fields for generating measures of utilization of the IT resources by the given IT function or process. Generating the data profiles may also or alternatively comprise identifying, in one or more of the storage systems, one or more tables and data fields and associated data types and sizes of the identified tables and data fields, analyzing data objects in the identified data fields to determine size, volume and usage history, identifying at least one of counts of and percentage of rows in the identified tables with null data and unique data for one or more specified data fields, analyzing one or more characteristics of the identified data fields, the one or more characteristics comprising at least one of minimum value, maximum value, average value and standard deviation, and utilizing the determined size, volume and usage history, the counts and percentages, and characteristics to determine one or more data fields utilized by a given IT function or process for generating measures of utilization of the IT resources by the given IT function or process.

The one or more data quality rules may comprise at least one of: one or more rules for maintaining an IT service catalog mapping IT services to underlying IT hardware and software in the IT infrastructure; one or more rules for maintaining IT software data, including categorizing IT software, maintaining a database inventory of IT software, establishing demand tracking within IT software, and standardizing name, classification and status of IT software information across different data consumers; one or more rules for maintaining IT hardware data, including categorizing IT hardware, maintaining a database inventory of IT hardware, maintaining relationships between IT hardware components, and maintaining relationships between IT hardware components and IT software in the IT infrastructure; one or more rules for maintaining organization structure information, including an internal IT structure of an organization utilizing the IT infrastructure; one or more rules for maintaining a register of capital assets and mapping capital assets to IT hardware and software in the IT infrastructure; one or more rules for maintaining licensing costs mapped to IT hardware and software in the IT infrastructure; and one or more rules for logging labor effort mapped to appropriate tasks and IT resources in the IT infrastructure.

Step 204 in some embodiments comprises comparing a first data set from a first data source with a second data set from a second data source to identify one or more data fields available from the first data source that are missing from the second data source, one or more data fields available from the second data source that are missing from the first data source, and one or more data fields that have different attributes in the first data source and the second data source. Step 204 in some embodiments may further or alternatively comprise analyzing a given data set from a given data source to identify one or more data values outside a designated range for a given data field, one or more data values having a null value, and functional data having values within or outside one or more specifications.

In some embodiments, step 204 further comprises, responsive to detecting the given data discrepancy, identifying at least one of the storage systems as a data source for the given data discrepancy, identifying an entity responsible for managing the data source, generating a notification detailing the given data discrepancy, and providing the notification to the identified responsible entity.

Step 206 in some embodiments comprises identifying at least one of the storage systems as a source of the given data discrepancy from which one or more data consumers obtain at least a portion of a given data set having the given data discrepancy and fixing the given data discrepancy at the data source prior to transfer of the given data set to the one or more data consumers.

Step 208 in some embodiments comprises one or more of: implementing at least one data quality check to validate new data for a given data set having the given data discrepancy prior to storage of the new data for the given data set in the one or more storage systems; and adjusting one or more IT processes and functions that store new data for a given data set having the given data discrepancy. Adjusting one or more of the IT processes and functions may comprise at least one of combining two or more IT processes and functions which store new data for the given data set and automating data flow between two or more of the IT processes and functions which store new data for the given data set.

Figure 2:
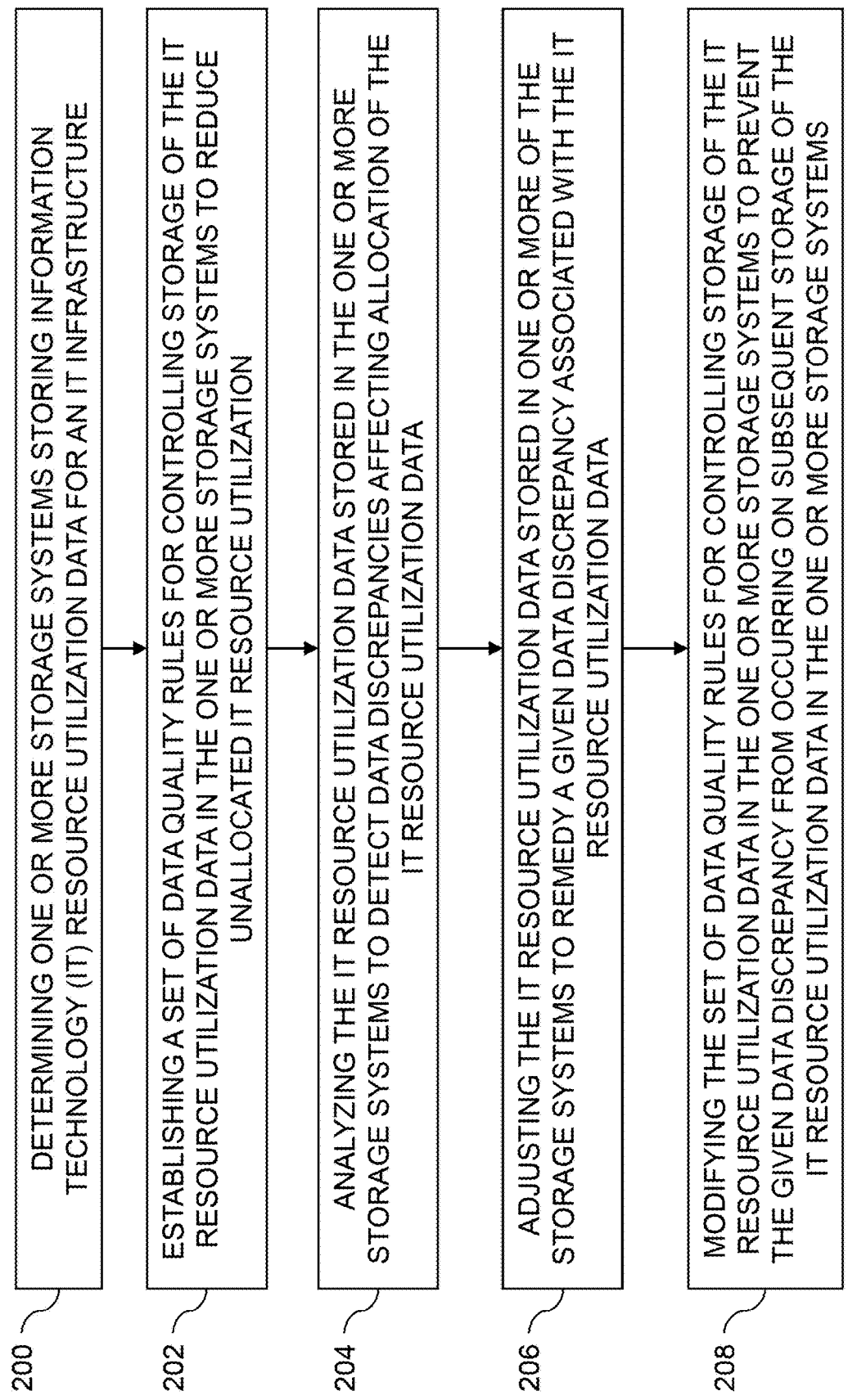
FIG. 2 is a flow diagram of an exemplary process for data quality servicing in an illustrative embodiment.

The FIG. 2 process may further comprise generating a report characterizing data quality trends based on analyzing the IT resource utilization data stored in the one or more storage systems over a designated time period and providing, over at least one network to a client device of a user responsible for managing at least a portion of the IT infrastructure, the report characterizing the data quality trends over the designated time period, wherein the report comprises one or more views of the data quality trends separated by at least one of data domain, data owner and underlying IT process. The report characterizing the data quality trends may be utilized to estimate an accuracy of IT resource utilization by determining unallocated IT resource utilization.

As described above, providing IT cost transparency presents a number of unique challenges. In a typical utility bill (e.g., an energy bill), detail regarding resource utilization (e.g., electricity used) may be precise, with a certain level of accuracy in both utilization and cost (e.g., rounded to a nearest cent, dollar etc.). In an IT context, however, IT resource utilization data is far more challenging. For example, there may be various delays associated with data gathering requiring adjustments to costs for IT products and services. In an IT cost transparency model, such as that utilized for preparing showback or chargeback bills, may seek to provide a fine level of detail regarding IT resource utilization and cost. Due to issues related to data quality (e.g., resulting in part from complexity of IT resource utilization data), this is more challenging than in a traditional utility context. Users of an IT infrastructure (e.g., such as customers, management, etc.) would like to see as much detail as possible. From the customer perspective, a detailed and accurate IT resource utilization report is desired for managing use without the IT resource utilization report having to be updated or otherwise modified once generated as may be necessitated by delays in data gathering or other factors relating to complexity of IT resource utilization data. From the management or IT infrastructure owner perspective, a detailed and accurate IT resource utilization report is desired for determining whether and where to upgrade the IT infrastructure, to determine underperforming IT business units, products or services, etc.

Producing on-time, accurate reports of IT resource utilization is a goal that requires certain standards for the underlying data quality used to generate such reports. The underlying data may include multiple levels of detail in different data sets regarding utilization of IT products and services. The size of the underlying data (e.g., thousands to millions of rows of data) may also be very large contributing to complexity and quality. Further, the data may be stored on many disparate storage systems (e.g., in one or multiple configuration management databases (CMDBs), etc.). There is a need for automated data quality servicing techniques to gather the required data together with reduced effort and sufficient quality to produce reliable reports of IT resource utilization. Embodiments provide techniques for implementing automated data quality servicing frameworks that meet these and other needs, reducing effort and resources required to capture IT resource utilization data and mapping or linking IT resource utilization data to cost and financial data.

Various types of IT processes, functions and applications may produce, maintain or consume data relating to IT products and services, including but not limited to: application commission and decommission, including lifecycle management; asset procurement, commission and decommission; IT service offerings, including processes for publishing and revoking IT service offerings; Information Technology Infrastructure Library (ITIL) process disciplines, such as Incident, Change, Release, Configuration and Request management; on-boarding and off-boarding IT personnel; processes for structuring and changing a structure of IT organizations and IT personnel; demand lifecycle and workflow management; labor effort compliance processes; etc.

Figure 3:
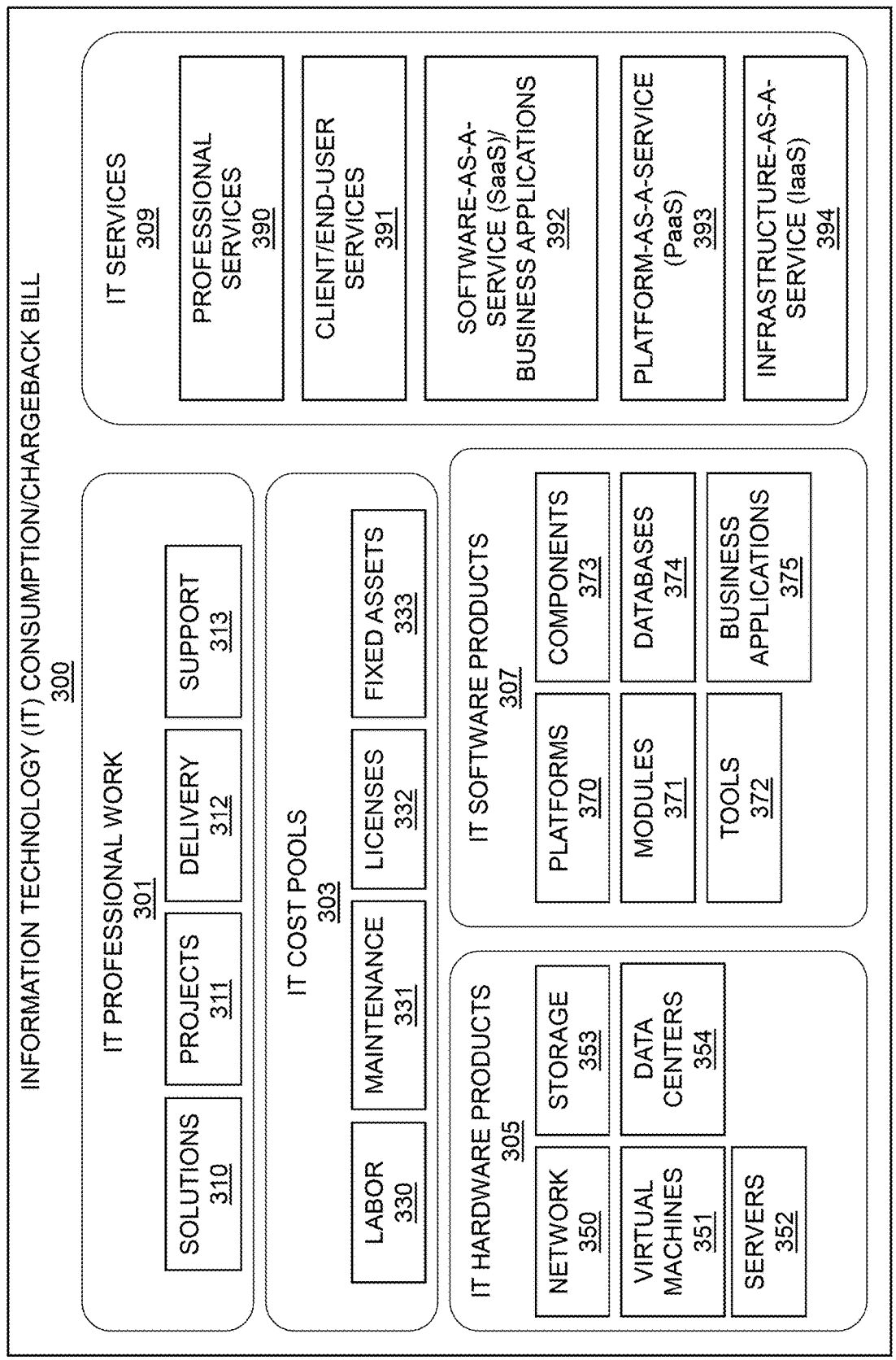
FIG. 3 is a block diagram of an example format for an information technology consumption or chargeback bill in an illustrative embodiment.

FIG. 3 shows an example format for an IT consumption or chargeback bill 300, which is an example of an IT resource utilization report. The IT consumption or chargeback bill 300 includes various data building blocks for IT professional work 301, IT cost pools 303, IT hardware products 305, IT software products 307 and IT services 309.

IT professional work 301 may include information regarding solutions 310, projects 311, delivery 312, support 313 provided by IT personnel, etc.

IT cost pools 303 may include costs associated with labor 330 (e.g., of IT personnel), maintenance 331 of IT infrastructure, licenses 332 (e.g., for IT hardware and software), fixed assets 333 of IT infrastructure, etc.

IT hardware products 305 may include network products 350, virtual machines (VMs) 351, servers 352, storage 353, data centers 354, etc.

IT software products 307 may include platforms 370, modules 371, tools 372, components 373, databases 374, business applications 375, etc.

IT services 309 may include professional services 390, client or end-user services 391, Software-as-a-Service (SaaS) (e.g., business applications) 392, Platform-as-a-Service (PaaS) 393, Infrastructure-as-a-Service (IaaS) 394, etc.

A number of applications and storage systems will produce and store the underlying IT resource utilization data needed for the data building blocks 301, 303, 305, 307 and 309 of the IT consumption or chargeback bill 300. The volume of such data may be very large (e.g., thousands or millions of rows of data) in various contexts, such as in demand management systems. As a result, the opportunity for the underlying data to be incorrect is also very high. Thus, there is a need for good policies and governance controlling storage of IT resource utilization data. Data quality servicing frameworks described herein provide functionality for improving data quality and efficiency in IT resource utilization, resulting in various benefits including implementing IT cost transparency.

Many important organizational decisions are based on factual data and analysis. If the data is incorrect, the analysis can go wrong and organizational decisions are misled. Thus, it is important to minimize data risk, such as in making important business decisions based on information provided by IT. Some of the common challenges related to data quality include a low degree of confidence in data quality across an IT data ecosystem, a lack of consistent data mappings and correlation of data across a system or systems of records, and a lack of consistent processes, functions, etc. which produce and store data in the system or systems of records.

Various systems provide input or IT resource utilization data, which presents challenges. For example, configuration management systems (CMSs) face challenges in that authoritative data sources may not be defined for all IT resources, there may be multiple unregulated systems of records, there may be a lack of or inadequate compliance processes, and poor data quality may undermine data utility. Challenges may also arise in the synchronization of multiple systems, such as the synchronization of a CMDB with business intelligence (BI), including that labor effort data must align with personnel data and applications data, that applications data must align or map with a fixed assets (FA) register, etc. Such alignment and mapping can be a manual and time consuming task. Data quality servicing frameworks described herein provide improvements by automating these and other tasks through the use of data quality rules that control storage of IT resource utilization data in storage systems. Further challenges relate to service catalog maturity and alignment, such as in challenges relating to disconnect in underlying data for services, and situations in which the personnel and processes are not mature enough to connect service data.

Figure 4:
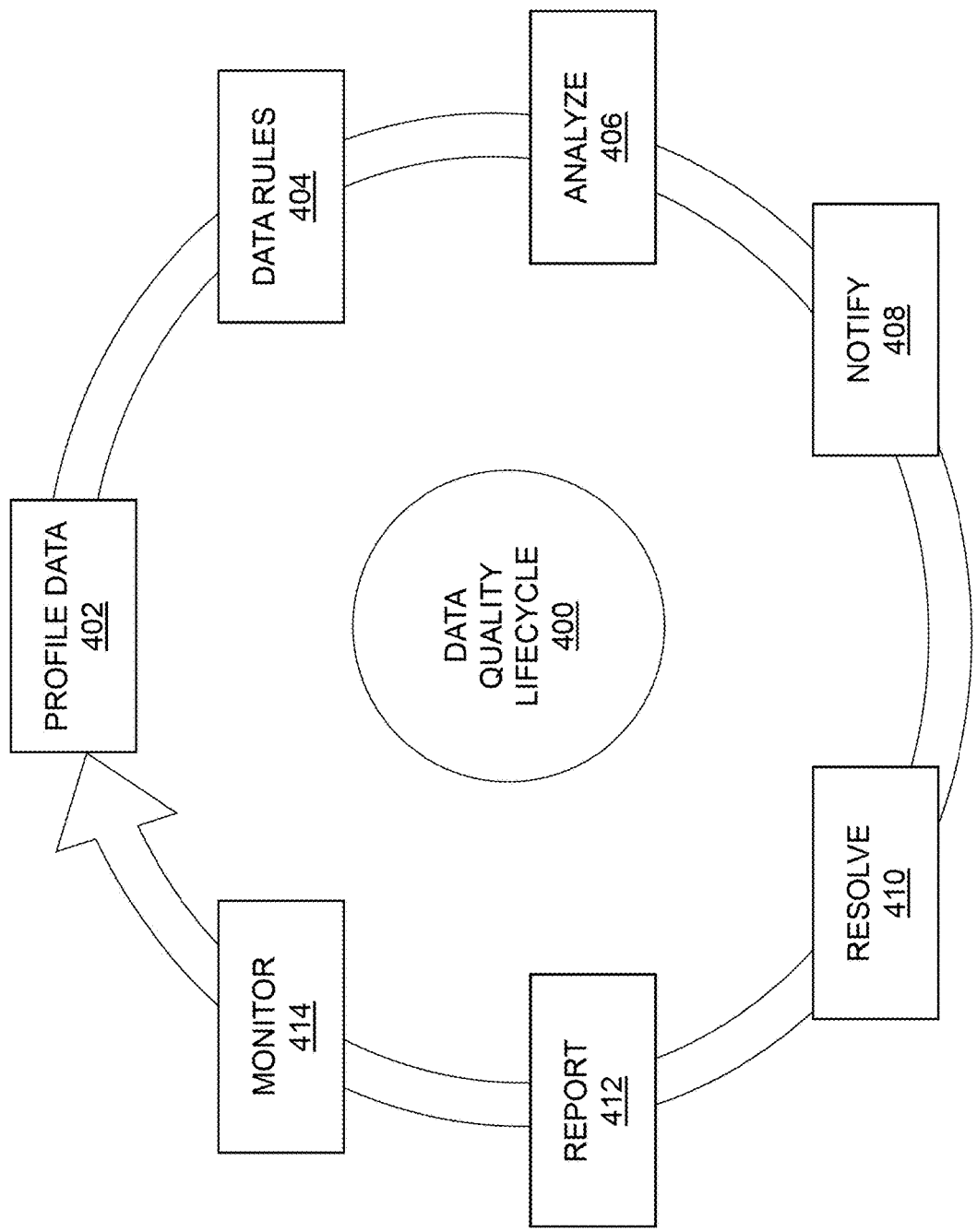
FIG. 4 is a block diagram illustrating a data quality lifecycle in an illustrative embodiment.

FIG. 4 illustrates a data quality lifecycle 400, illustrating various steps involved in maintaining and providing good quality of data for IT cost transparency modeling. The data needed for implementing IT cost transparency modeling may be stored in multiple systems of records across one or multiple storage systems. In some embodiments, it is critical that these systems of records have correct and complete data needed as input to an IT cost transparency model. In conventional systems, the details of IT products and services were not exposed or insufficiently exposed. Further, conventional systems may not have recognized the need or advantages to providing granular detail regarding IT resource utilization. Thus, there may be various different data integrity challenges associated with transitioning various organizations to an IT cost transparency model, as the data needed was not necessarily important in the past and may not be well maintained.

In the data quality lifecycle 400, data profiling 402 is used to identify data integrity challenges in the system or systems of records storing IT resource utilization data. The scope of data profiling 402 may depend on the details of data that is expected or planned for use in preparing IT resource utilization reports such as IT consumption or chargeback bill 300.

Generally, functional data is put together for analysis into groups of data referred to as data domains. Examples of data domains which may be utilized in some embodiments include people or personnel data, labor effort data, applications data, IT infrastructure data, cost data from financial ledgers, etc. It is to be appreciated, however, that these are merely examples of possible data domains and that embodiments are not limited to use with these specific data domains. In other embodiments, additional or different data domains may be utilized as desired. Any identified data discrepancies may be notified to appropriate data stewards and data owners. A set of data quality rules 404 are then designed for controlling storage of IT resource utilization data (e.g., validating data, etc.) on an ongoing basis.

Depending on the type of data, how data is stored in a system or systems of records, and how data is consumed in the IT cost transparency model, different types or patterns of analysis 406 may be desired. Such patterns of analysis may include: validity, or determining whether all data values are within specified ranges that do not cause errors; accuracy, or determining whether the data from the system or systems of records can be verified; consistency, or determining whether data is consistent between different data sources or systems of records, including determining whether data is missing or duplicated in such different data sources or systems of records; integrity, or determining whether entities and attributes of data are consistent, such as within tables and between tables; timeliness, or determining whether data is available at the time that it is needed (e.g., determining whether timesheet data is timely, meaning whether it is available on-time or after a time period such as a billing period is complete); and completeness, or determining whether all necessary data is present, which may involve checking for mandatory elements used in computation or reporting IT resource utilization. It is to be appreciated that the above are merely examples of certain patterns of analysis 406 that may be used in some embodiments. In other embodiments, various other patterns of analysis may be used in addition to or in place of one or more of the above patterns of analysis 406.

Data that does not comply with or conform to data quality rules 404 is arrived at through analysis 406. Based on such analysis 406, data owners and data stewards may be notified 408 of any data that is not compliant with the data quality rules 404. Data discrepancy may be communicated in various forms. In a bottom up approach, specific data owners or data stewards may be identified for each data discrepancy, and a message is composed and communicated to such data owners or data stewards regarding how and where to fix the data errors.

The data owners or data stewards provide resolutions 410 of the data discrepancies. The data owners or data stewards may also identify a root cause of the data discrepancies or data errors. The root cause may be, for example, process errors, system errors, etc.

Data errors or discrepancies are also summarized and reported 412, such as to management or other personnel responsible for looking at the health of the data (e.g., to see if the health of the data is trending up or down). In the IT cost transparency model, unallocated and misallocated costs are monitored 414 to ensure data quality resolutions are provided and are giving good results.

Figure 5:
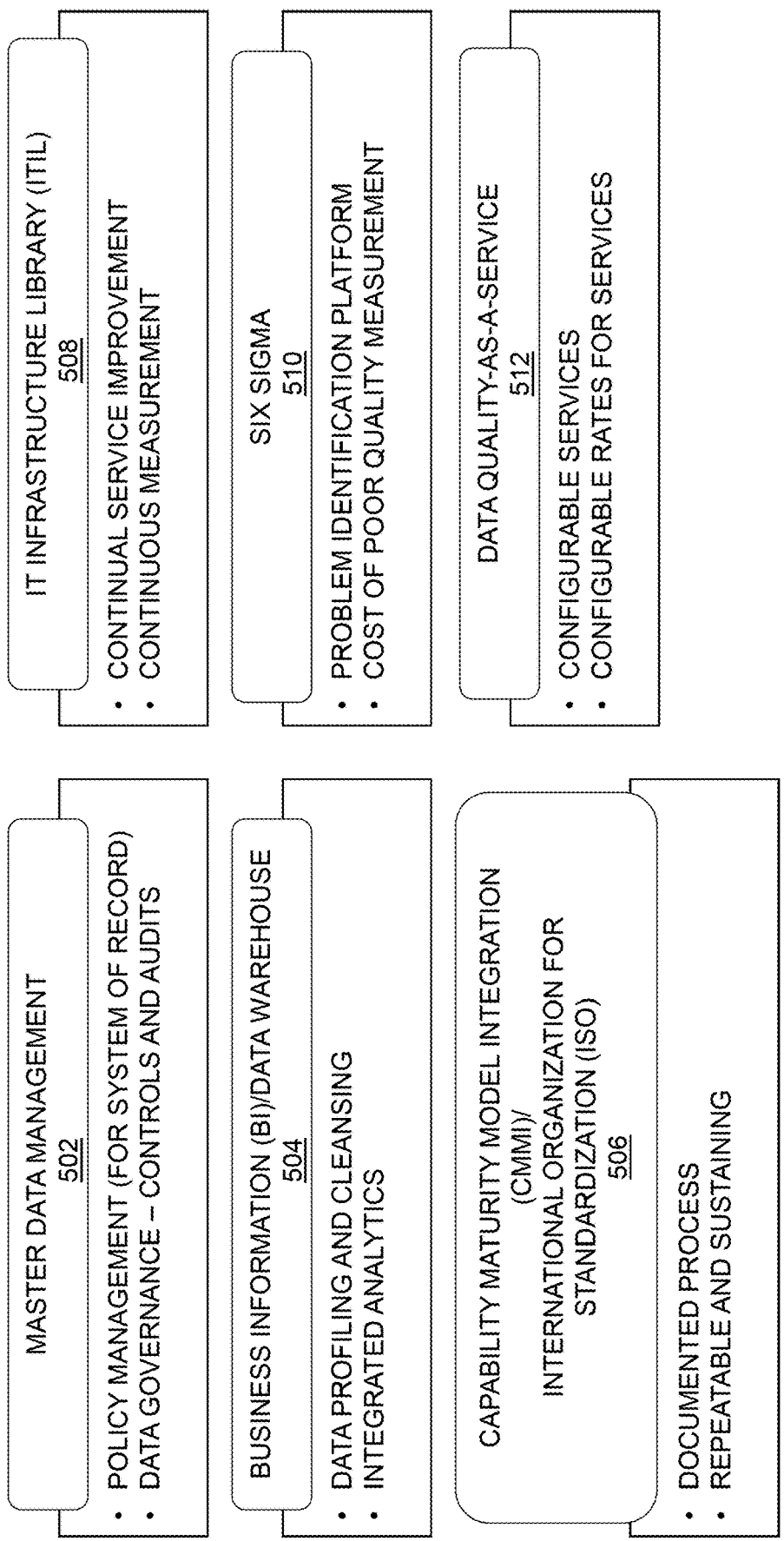
FIG. 5 is a block diagram depicting different interface areas for a data quality lifecycle in an illustrative embodiment.

FIG. 5 shows various interface areas for a data quality servicing framework, including master data management 502, BI/data warehouse 504, capability maturity model integration (CMMI)/international organization for standardization (ISO) 506, ITIL 508, six sigma 510 and Data Quality-as-a-Service 512. Master data management interface area 502 includes policy management, such as for a system or systems of records, and data governance including controls and audits. BI/data warehouse interface area 504 includes data profiling and cleansing, integrated analytics, etc. CMMI/ISO interface area 506 includes documented processes that are repeatable and sustaining. ITIL interface area 508 includes continual service improvement and measurement. Six sigma interface area 510 includes a problem identification platform and a way to measure the cost associated with poor quality measurement. Data Quality-as-a-Service interface area 512 includes configurable services and rates for services. These various interface areas may be utilized in different steps of the data quality lifecycle 400.

The steps of the data quality lifecycle 400 will now be described in further detail. As mentioned above, the first step of the data quality lifecycle 400 is profiling data 402 from a system or systems of records.

Data profiling in step 402 includes an analysis of the health of data, from both business use and technical integrity perspectives. Data profiling 402 is a process of data discovery and statistical examination of data sources, and provides a first step toward improving data quality validation, such as for validating data patterns and formats. In some embodiments, data profiling 402 helps an organization to improve maturity of integrated data-driven enterprise level applications. Data profiling 402 in some embodiments refers to analytical techniques that are used to examine existing data for completeness and accuracy. Advantageously, data profiling 402 can help with master data management and data governance, such as by assessing metadata.

Different approaches may be used to determine the scope of data profiling work. In some embodiments, top-down approaches are used. Such approaches generally help to achieve a specific IT process or function, and provide quick results. In other embodiments, technical or bottom-up approaches may be used to help scan data sources for analyzing specific patterns used to assess data quality and make recommendations for improving data quality. Such approaches are generally suitable for large, enterprise package implementations. It should be appreciated that some embodiments may use combinations of bottom-up and top-down approaches for data profiling in step 402.

Top-down approaches, also referred to as business perspective approaches, include but are not limited to: profiling IT function or process scope (e.g., cost transparency programs); profiling data sources that are involved in IT functions and processes; profiling data formats, including input and output formats for an IT function or process; and profiling computations for measuring IT resource utilization, including the data fields needed for such computations; etc.

Bottom-up approaches, also referred to as technical perspective approaches, include but are not limited to: examining metadata for identifying tables and fields, including their associated data types and sizes; analyzing data objects, such as their associated size, volume, usage history, etc.; identifying a count and percentage of rows with null data for a specific field; identifying a count and percentage of rows with unique data for a specific field; analyzing for minimum value, maximum value, averages, standard deviations, etc.; analyzing for potential key fields and potential categories useful for measuring IT resource utilization; identifying potential unused fields that can be avoided or ignored during data transfers to reduce bandwidth or consumption of network and storage resources, etc. It should be appreciated that embodiments are not limited solely to use with the specific examples of top-down and bottom-up approaches for data profiling in step 402. In other embodiments various other top-down and/or bottom-up approaches may be used in addition to or in place of the examples described above.

Step 404 of the data quality lifecycle 400 includes developing data quality rules. An organization or organizations managing IT infrastructure may use many applications, database systems, etc. Thus, data produced in one part of an organization may be consumed or utilized by IT functions and processes (including applications) in other parts of the organization. Generally, it would be operationally more efficient if the same data sets were shared by such different IT functions and processes. Depending on how the data is being used by such different IT functions and processes, however, the data validity and data integrity needs may differ. As a result, the importance of completeness and correctness of data produced may not be known or may not be clear at the place or part of the organization where the underlying data is originated. To bring visibility into varying data needs (e.g., relating to validity, integrity, quality, etc.), an integrated governance body can produce and govern data quality rules in step 404 which control storage of IT resource utilization data. The governance body may include business owners, data owners and data stewards. Data stewards may be formed based on data domains. Data quality analysts may help the governance body with deep dive analysis of patterns and discrepancies in the data.

In some embodiments, it is desired to manage the data quality rules 404 in a central place. This permits the data quality rules to be integrated with data profiling and data quality tools across an IT infrastructure, bringing repeatability and reusability, increasing efficiency. Described below are various example of data quality rules that may be used for implementing an IT cost transparency model for efficient utilization of IT resources. It should be appreciated, however, that embodiments are not limited to use solely with these specific data quality rules and that other embodiments may utilize various other types of data quality rules in addition to or in place of one or more of the examples described below.

For an IT service catalog, data quality rules may include rules relating to ensuring a well-categorized service catalog and capabilities mapped to underlying IT products. For IT software or applications data, data quality rules may include rules for: categorizing software products as platforms, tools, applications, databases, etc.; demand tracking systems for projects, work requests, changes, incidents, requests, etc. that are integrated with IT applications; maintaining database inventory, and mapping the database inventory with platforms, applications, tools, etc.; naming, classification and status (e.g., using a same name, classification and status) to be reflected in consumer systems of applications information; mapping consumer business units to IT products based on consumption data; etc.

For IT hardware or server data, data quality rules may include rules for: categorizing infrastructure assets as servers, VMs, storage, racks, blade, arrays, devices, etc.; maintaining inventory in a CMDB or other system, and for making inventory data available to other systems as required; maintaining relationships of various hardware components, such as storage-to-servers, VMs-to-hosts, etc.; maintaining attributes of hardware, such as manufacturer model, location, data center etc., and for ensuring that the same attributes are referred to in applications using this data; maintaining up-to-date relationships of hardware assets to software assets; maintaining up-to-date and accurate contact information for maintenance of infrastructure assets; etc.

For organization structure and business units data, data quality rules may include rules for: maintaining the organizational structure, including business units and internal IT structure, in a central location; and for providing information related to the organizational structure to other systems that refer to or utilize it, including systems such as demand tracking, assets responsibility hierarchy, etc.

For general ledger, fixed assets and maintenance data, data quality rules may include rules for: making available all necessary cost lines from a general ledger to an IT cost transparency model; maintaining fixed assets register data for capital assets and capital in progress assets, and for mapping such data with hardware and software products, projects, etc.; maintaining licensing and maintenance costs, and mapping such costs to hardware and software assets; etc.

For incidents, requests, changes and deployment data, data quality rules may include rules for: maintaining up-to-date support queues, escalation matrix and routing matrix data and associated contacts; ensuring that necessary people or personnel data and assets data is referred from a system or systems of records; maintaining demand status and escalations data; etc.

For labor effort data, data quality rules may include rules for: ensuring that all IT resources belonging to IT cost centers have facilities for logging effort; ensuring that effort logged is not too high or too low, and that the effort for a designated time period (e.g., a week) is logged on-time without delay; ensuring that the effort logged represents appropriate tasks, and that effort logged is well mapped to services, projects, work requests, production support or any other categories as needed; etc.

For people or personnel data, data quality rules may include rules for: maintaining up-to-date people or personnel data in a system or systems of record, including information such as status, organization structure, manager, cost center, department, country, cost region, vendors, contractors, rates, etc.; ensuring that systems which refer to people or personnel data do so from the appropriate system or systems of records; ensuring that resources working in IT functions are not in IT cost centers or an IT department; etc.

Step 406 of the data quality lifecycle includes analysis of data discrepancies. A significant challenge in analyzing data quality is that there are often multiple data sources. Combining different data sets from such multiple sources is a complex and convoluted process, as the data sets may not fully match one another, which impacts corresponding IT processes and functions, including applications. Combining multiple data sources can also delay the process for making accurate reports of IT resource utilization from the data. In some cases, there may be many unmapped values which make it difficult to produce any IT resource utilization report out of the data.

In some embodiments, data analysis in step 406 involves making careful observations about the kind or types of tasks involved. There are some patterns of analysis for finding data discrepancies, which help to identify some repeatable data quality processing steps that may be automated using a data quality servicing framework. Various examples of patterns for analysis will now be described. It should be appreciated, however, that embodiments are not limited solely to use with the specific patterns for analysis described below and that various other patterns for analysis may be used in other embodiments in addition to or in place of one or more of the below-described patterns for analysis.

In one pattern for analysis, two different data sets are compared. The two data sets may be referred to as "left" and "right" data sets or data sources. The comparison may be "left to right" to determine any key fields that are missing on the right data source, or "right to left" to determine any key fields that are missing on the left data source. The comparison may also determine whether attributes are different between the left and right data sets (e.g., different rate values in the different data sets).

In another pattern for analysis, validation is performed within a data set. Validation may include determining whether any data values are out of range, determining null values, and determining functional data (e.g., whether values are within or not within specifications). Other patterns for analysis may also include complex validations, such as of multiple data sources and attributes. As one example, timesheet compliance may be viewed as a complex validation, establishing a standard set for comparison with actual data across multiple data sources and attributes.

Further patterns for analysis handle dealing with exceptions. For example, in the above-described patterns for analysis, there may be some exceptions to be considered, and these exceptions should be rules-based with underlying data supporting the rules.

Given some patterns of analysis for analyzing data discrepancies, the steps involved in such patterns may be studied and a plan for automating such steps is developed. In some embodiments, most data discrepancies are fit into the above patterns, and thus are suitable for automation (e.g., such as through the establishing of data quality rules controlling storage of IT resource utilization information). This automation helps to reduce manual work and error, and reduces the time and resources necessary for analyzing data discrepancies in step 406.

There may be multiple systems of records for the same data, which complicates the process of determining which system is or should be deemed correct. In many instances, this may involve fighting bad data with other bad data, as the system or systems of records may not be fully clear for certain data sets. Ideally, personnel should be trained about the root causes of bad data, such as where underlying processes are not integrated, where tools or systems deployed for the underlying processes have some overlapping functionality, etc. Also, tools or systems may have been deployed at different points in time, possibly by different IT personnel, and thus there may not be good integration of the process steps or a lack of automated data flow between systems leads to duplicate data. Such cases provide good opportunities for improving data quality by reducing duplicate functionality in tools and systems by automating data sharing between the tools and systems.

In some embodiments, it is desired to automate data quality analysis work in step 406. Due to the complex nature of the analysis involved in making compliance checks for the data, automation is recommended. Significant benefits in terms of time and resources expended may be achieved by automating repeating patterns of analysis. Verification processes generally take place after the fact and are reactive work. Thus, some embodiments shift the focus towards proactive measures, applying mistake proofing techniques to ensure that data errors do not occur again by fixing the root causes. Opportunities for mistake proofing include: correcting, integrating and simplifying underlying IT functions and processes; automating process steps instead of relying on manual compliance checks; integrating different systems when they share common data like master data, such as by ensuring that data is entered in one system and consumed in the rest of the systems; and introducing validation checks, mandatory fields, etc. within IT functions and processes to ensure that incorrect data does not get into the system or systems of records. Various other techniques for mistake proofing may be utilized in other embodiments.

Step 408 of the data quality lifecycle 400 includes notifying data discrepancies to data owners and data stewards. Communication can play a key role in bringing awareness about data quality issues. If there is no communication, IT personnel may make assumptions, such as assumptions that the quality of data is good. If the data is not of good quality, however, various decisions made on such assumptions will carry underlying risk.

In an organization, data can carry messages similar to how the neural system does for the human body. In large organizations, for example, personnel are often focused primarily about their functional area within the organization. Thus, personnel may not realize how data generated within their functional area is consumed by other parts of the organization. By notifying data errors or discrepancies to the right personnel, embodiments can bring such awareness along with accountability of who should be fixing data errors or discrepancies.

Accountability may be established in each data domain as described above. Data stewards or data owners may be identified and assigned to data domains for all data consumed in the IT cost transparency model. From the top-down approach, this accountability helps to fix underlying systems and processes. In a bottom-up approach, notifying individuals who are actually supposed to fix the errors or discrepancies is a huge task, which may lead to administrative overhead. Thus, there is an opportunity to automate such communications and provide significant advantages.

When performing notification in step 408, messages may be overwhelming depending on who and how many people within an organization receive such messages. If messages are overwhelming, this brings in noise. To prevent such noise, various techniques may be used. Six sigma techniques may be applied to look for the most optimal audience for a communication. For example, there may be a general rule of thumb that twenty percent of the audience are accountable and can fix eighty percent of data errors, thus communication may be focused on the twenty percent as recipients of the appropriate notifications. When communications are automated, advanced statistical thresholds may be applied to categorize the important audience (e.g., into high, media and low importance recipients, etc.). Notifications may be progressively communicated to a larger audience once key personnel are convinced of the need to fix data errors.

In some embodiments, a general goal is to minimize or reduce the number of notifications that are sent. As such, instead of notifying on each error or data discrepancy, errors or data discrepancies may be grouped into batches (e.g., into batches of a hundred or two hundred errors, etc.), with flexibility for adjusting batch size and characteristics as desired. Notifications should also be configurable for sending or ceasing sending to certain designated personnel (e.g., high profile personnel within an organization, persons outside the score scope of the organization, etc.) to minimize noise.

Step 410 of the data quality lifecycle 400 includes resolving the data discrepancies in the system or systems of records. The benefits of steps 402 through 408 of the data quality lifecycle 400 are realized when data errors or data discrepancies are fixed in step 410. There are various strategies and techniques which may be used to fix data errors and data discrepancies, which will be described in detail below.

A first decision or strategy is in where data errors or data discrepancies are fixed. There may be extract, transform, load (ETL) methodologies used to transfer data to different IT functions or process within an organization or IT infrastructure. ETL approaches consider data cleansing as part of the transformation of data to the needs of the consuming IT functions or processes. A drawback of ETL approaches, however, is that cleansing is repeatedly required for each IT function or process that consumes the data having data errors or data discrepancies. Further, this leads to different interpretations of data based on the different ways of cleansing data that may be used by different tools or personnel.

Figure 6:
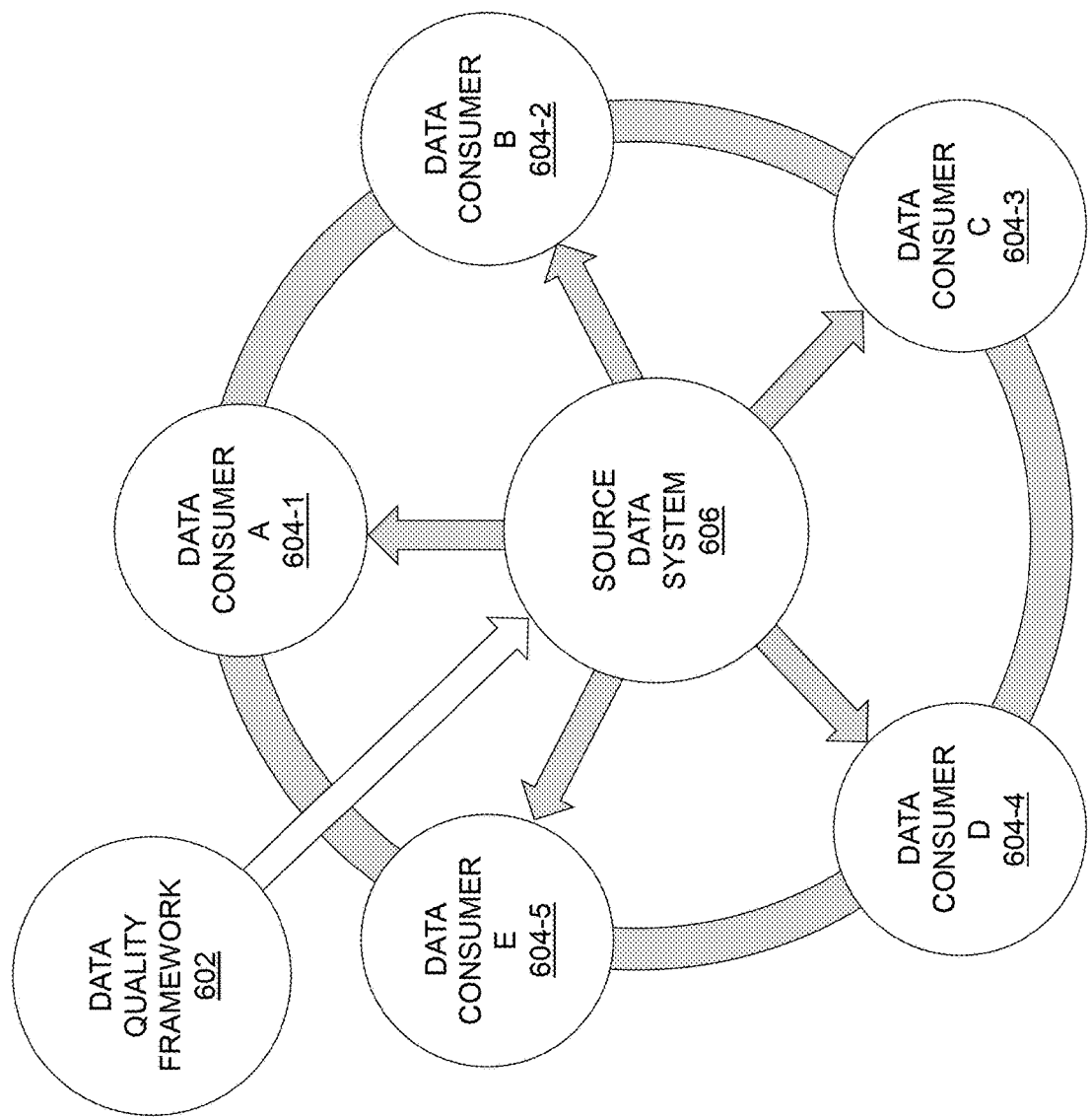
FIG. 6 is a block diagram illustrating a data quality service framework operating on a data source utilized by multiple data consumers in an illustrative embodiment.

Some embodiments provide techniques for more efficient ways of fixing data errors and data discrepancies by fixing such errors and discrepancies at the system or systems of record, rather than fixing them at every consumption or data transfer point within the IT infrastructure. FIG. 6 illustrates a data quality servicing framework 602 which operates on source data system 606 whose data is consumed by various data consumers 604-1, 604-2, 604-3, 604-4, and 604-5 (collectively, data consumers 604). Efficiency is achieved by fixing the data directly in the source data system 606, rather than at each consumption or data transfer step (e.g., to data consumers 604). Further, fixing the data errors at the source data system 606 helps to reduce the cycle time in getting the data, as quality data is available on-demand without having to fix data errors. General data needs master data, mapping data and a transaction summary. Correction at data transfer points requires N*T resources, where N is the number of source data systems and T is the number of data transfer/consumption points. Correction at the source data system(s), however, requires only N resources.

While FIG. 6 shows an arrangement with just one source data system 606, embodiments are not so limited. There may be multiple different source data systems, possibly implemented on different storage systems. In some cases, the data consumers 604 may represent such other source data systems. The data consumers 604 may alternatively represent IT functions or processes, or users of client devices that access or otherwise utilize IT infrastructure. The different data systems may interact on a one-to-many basis (e.g., from one source data system 606 to multiple data consumers 604), on a many-to-one basis (e.g., multiple data consumers 604 provide data to the source data system 606), or on a many-to-many or network of source data systems, where each source data system may receive and provide data to multiple other source data systems.

Figure 7:
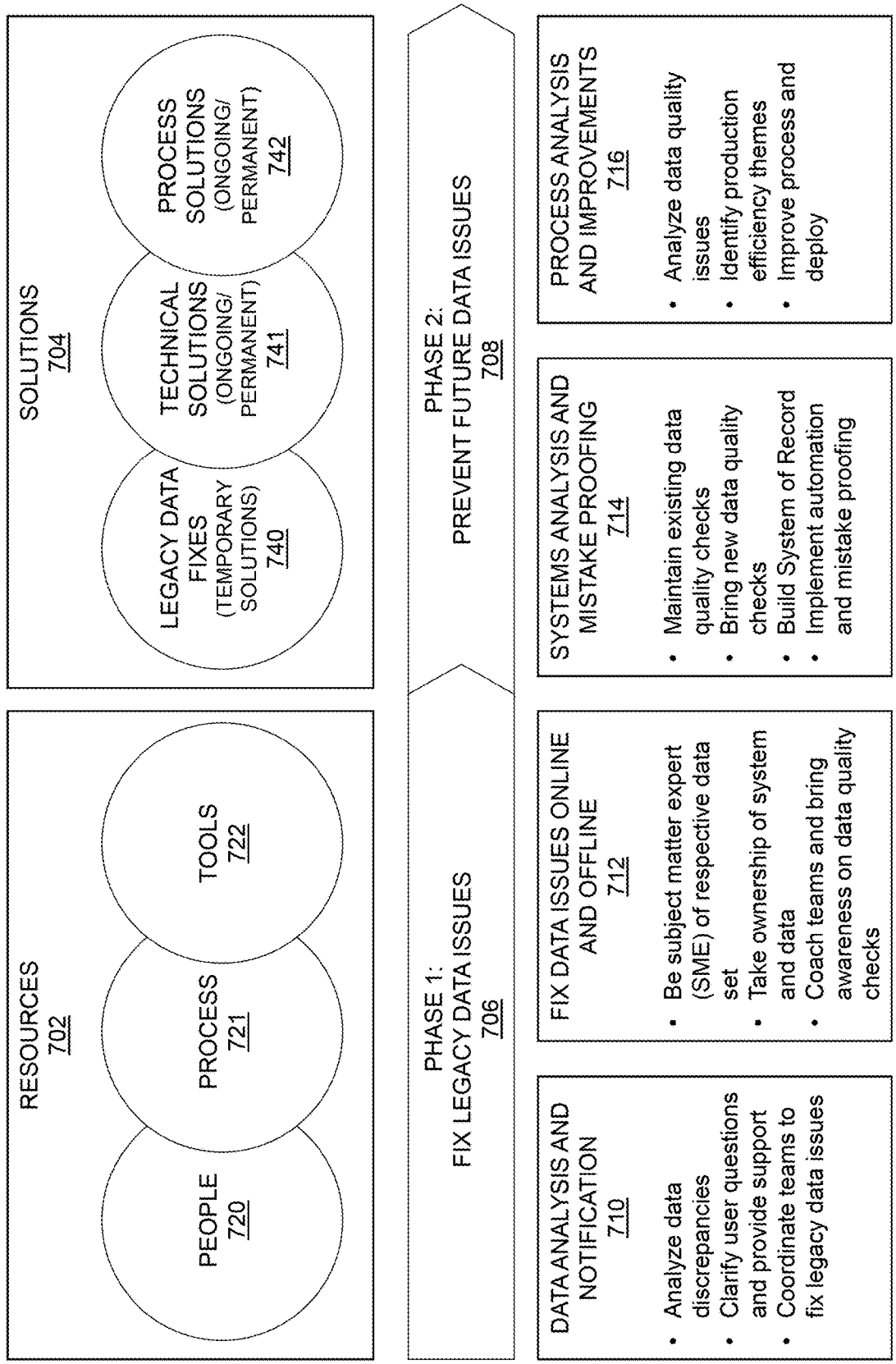
FIG. 7 is a block diagram depicting multiple phases for managing data quality in an illustrative embodiment.

In addition to deciding where to fix data errors and data discrepancies, approaches must also decide how to fix the data errors and data discrepancies. When looking at the time trend of when data errors and data discrepancies are introduced into an IT system and analyzing how data errors and data discrepancies are likely to be introduced in the future, there are two main situations which arise: data errors or discrepancies that are already in the system or systems of records, and data errors or discrepancies that are going to occur in the future. Approaches for fixing data errors and data discrepancies should be tailored to resolving these different scenarios. FIG. 7 illustrates a high-level approach and plan for fixing data errors and data discrepancies, along with underlying tools, systems and processes which may be used to fix data errors and data discrepancies.

FIG. 7 shows resources 702, such as people or personnel 720, processes 721 and tools 722, along with solutions 704 such as legacy data fixes 740 (e.g., temporary solutions), technical solutions 741 (e.g., ongoing or permanent solutions) and process solutions 742 (e.g., ongoing or permanent solutions). In a first phase 706, the resources 702 are utilized to fix the legacy data issues (e.g., using legacy data fixes 740). In a second phase 708, the resources 702 are utilized to prevent future data issues (e.g., using technical solutions 741 and process solutions 742). To do so, various approaches are used, including data analysis and notification 710, fixing data issues online and offline 712, systems analysis and mistake proofing 714, and process analysis and improvements 716.

Data analysis and notification 710 includes analyzing data discrepancies, clarifying user questions and providing support, and coordinating teams to fix legacy data issues. Fixing data issues online and offline 712 includes establishing a subject matter expert (SME) of a particular data set or data source, taking ownership of a data set, data source or system of records, and coaching teams and bringing awareness to data quality checks. Systems analysis and mistake proofing 714 includes maintaining existing data quality checks, bringing new data quality checks, building a system or systems of records, and implementing automation and mistake proofing in the system or systems of records. Process analysis and improvement 716 includes analyzing data quality issues, identifying production efficiency themes, improving processes and deploying the improved processes.

Considerable focus may be directed to measuring data quality and assessing data quality measurements. In some embodiments, however, a focus is placed on discovering and remedying root causes of data quality issues. Various approaches may be used for obtaining the benefits of resolving data errors and data discrepancies without spending too much time on non-core activities (e.g., such as measuring data quality and assessing such measurements). Such approaches include but are not limited to: making separate plans for legacy data fixes and ongoing or permanent data fixes (e.g., the two-phase approach of FIG. 7); increasing focus on ongoing data fixes, and in determining how to make such data fixes permanent by fixing underlying IT processes, tools, systems, etc.; analyzing the process and design workflows and scenarios involved and considering simplifying and implementing integrated IT processes; while designing workflows for different scenarios, planning for data correction actions or further decision making points to be considered in fixing data errors and data discrepancies; tweaking underlying IT functions and processes; considering process steps that are automated in IT tools and systems, and applying fixes to such IT tools and systems by altering IT functions and processes, implementing validation checks, simplifying process steps, etc.; considering automating the data flow between IT functions and processes and associated storage systems storing IT resource utilization data instead of depending on manual re-entry of the same data in different systems; considering master data management processes and tools that are exclusively for IT, including starting with master data for an IT cost transparency model; mapping data plays for IT cost transparency modeling, as data is interpreted in much deeper and broader contexts for producing IT cost transparency reports, where such views require integration of different data sets through mapping data; ensuring that master data and mapping data is shared with all systems and stakeholders involved; and planning for taking care of change management for master data, mapping data and other data sets; etc.

Step 412 of the data quality lifecycle 400 includes reporting trends (e.g., data quality scorecards or other measures of data quality over time) to appropriate personnel or users, such as to management in an organization. Conventionally, data quality was assumed while producing reports or summaries. This, however, can lead to major flaws in decision making processes when there are data errors and data discrepancies in the underlying data on which reports or summaries are based. The risks to decision making processes from data quality are made known upfront by measuring the quality of the underlying data. Some data errors may have less impact than others, depending on the consumption of the data. In the case of financial transparency, data errors and data discrepancies that contribute to unallocated costs in an IT cost transparency model are direct bad data that requires high attention. Sometimes, a high volume of errors for a first data domain are identified, where the high volume of errors has a relatively small impact on the IT cost transparency model while a smaller volume of errors for another data domain are not identified by contributing a larger impact on the IT cost transparency model. Recording and monitoring relevant quality and quantifiable information is helpful for prioritization of efforts required for correcting data errors and data discrepancies.

Also, it can be important to ensure that data quality trends are monitored, as the data quality can drop due to various changes in an organization. The data quality trends can help appropriate personnel to see how the processes and systems contributing or producing data perform over a period of time. Building systems and processes to measure and monitor data quality is an important task, and sharing this data with appropriate personnel (e.g., with management via scorecards, dashboards, etc.) can be an equally important task. Providing reports helps management or other personnel to take corrective actions, and to prioritize efforts required for correcting data errors and data discrepancies.

In some embodiments, reports generated in step 412 of the data quality lifecycle 400 include periodic trend reports (e.g., quarterly, monthly, weekly, etc.). The trend reports can include one or multiple different views, such as by data domain, by system or systems of records or tools, by data owners and data stewards, by underlying IT process, by process owners, etc.

Measuring data quality repeatedly over time can provide numerous benefits, including but not limited to: profiling systems to identify high-level opportunities for improvement; measuring data quality rule compliance across data sets; providing point-in-time data; establishing cost of poor quality (COPA) methods; performing root cause analysis; identifying long-staying or chronic data errors and data discrepancies; identifying teams and areas contributing to downward trends of data errors and data discrepancies; alerting to sudden changes in scorecards, which may be due to technical failure or changes in the underlying cause of data errors or data discrepancies or in the measurement thereof; etc.

Step 414 of the data quality lifecycle 400 includes monitoring unallocated costs in an IT cost transparency model. Monitoring of data quality in step 412 of the data quality lifecycle 400 helps to provide visibility into trends, such as for management to get visibility on trends relating to accuracy of IT invoices in an IT cost transparency model, for data owners to understand trends of functional and process efficiencies; for data stewards to know the current data issues requiring high attention; etc. In some embodiments, an important quantification of the impact of data errors and data discrepancies is in IT resource utilization, including cost and pricing and monitoring unallocated costs related to IT resource utilization. Building a governance process for reviewing and making decisions about changes in trend data is thus important, as it gives direction to teams to perform root cause analysis, to improve source systems and source processes that help to reduce costs associated with data errors and data discrepancies in the long-term, etc.

Various rules may be considered while building or analyzing unallocated costs in an IT cost transparency model, including but not limited to: mapping depreciation cost to applications, assets, services, etc.; mapping maintenance costs to applications, assets, services, etc.; mapping labor effort to applications, assets, services, etc.; keeping one version of inventory for services, applications, hardware assets and other configuration items (CIs), etc.; identifying missing timesheets on a weekly or other periodic basis; identifying when hours logged are not in range, such as too high or too low as compared to normal working hours (e.g., daily, weekly, etc.); maintaining people or personnel data with correct (e.g., not blank) roles for properly assigning rates; mapping business units to all services and applications for measuring consumption of applications; ensuring that business units referenced in all systems match for proper chargeback to the business units; mapping lower-level CIs (e.g., servers, databases, etc.) to applications; mapping servers, VMs, etc. to corresponding applications or end-user consumption data; maintaining up-to-date and accurate contractor rates; maintaining appropriate people or personnel data in all systems (e.g., with a badge identifier (ID), NTID, etc.), maintaining ownership of CIs for operational purposes; maintaining necessary service provider related information for work request and incidents; and maintaining the status of CIs (e.g., lifecycle) in various systems; etc.

Some data errors and data discrepancies have a higher impact (e.g., a higher cost or dollar impact) on IT resource utilization measurement and cost allocation than other data errors and data discrepancies. Identifying high-impact data errors and data discrepancies is normally achieved through analyzing unallocated costs in an IT cost transparency model. Thus, it is important to design the IT cost transparency model to capture the unallocated costs, and to report unallocated costs by data domain, process, cost object, data source, etc. Establishing relationships between unallocated costs and associated data errors and data discrepancies plays a key role in prioritizing the effort required to fix the data errors and data discrepancies. Without this prioritization, effort may be wasted by allocating resources for correction of many low-impact data errors and data discrepancies that may not have a large impact on the accuracy of IT resource utilization measurements and cost allocation.

Figure 8:
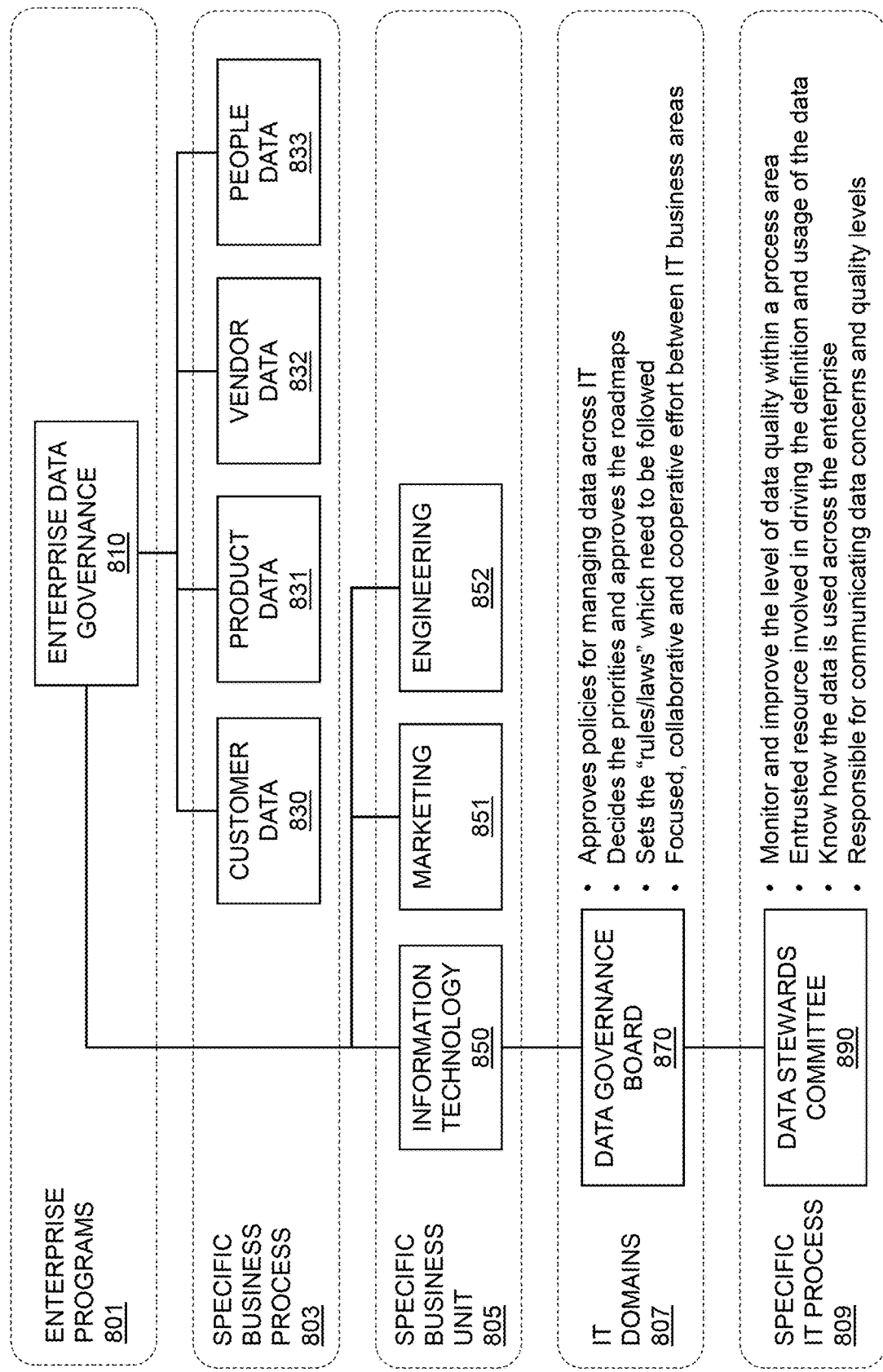
FIG. 8 is a block diagram of a data governance model in an illustrative embodiment.

Ownership and accountability are essential for efforts involved in developing and maintaining an IT cost transparency model. Data quality servicing frameworks are implemented within an overall data governance model, such as the data governance model shown in FIG. 8. The FIG. 8 data governance model includes enterprise programs 801, specific business processes 803, specific business units 805, all IT domains 807 and a specific IT process 809. At a top level, the enterprise programs 801 implement enterprise data governance 810. Specific business process 803 implement consumer data 830, product data 831, vendor data 832 and people or personnel data 833. Specific business unit 805 implements information technology 850, along with marketing 851 and engineering 852. All IT domains 807 implement a data governance board 870, and a specific IT process 809 implements a data stewards committee 890.

The role of the data governance board 870 is to approve policies for managing data across the IT infrastructure (e.g., across all IT domains 807), to decide the priorities and to approve roadmaps, to set the rules or laws to be followed, and to provide focused, collaborative and cooperative effort between IT areas. The role of the data stewards committee 890 is to monitor and improve the level of data quality within a particular process area of the specific IT process 809, to handle resources involved in driving the definition and usage of IT resource utilization data, to know how such data is used across an organization or enterprise, and to be responsible for communicating data concerns and data quality levels.

By conducting regular data governance board 870 meetings or monitoring and regular data stewards committee 890 meetings or monitoring, embodiments can help to bring in more visibility to an organization. Such meetings or monitoring can help to resolve any issues, so that steps required for fixing data errors and data discrepancies, including underlying root causes, can happen smoothly and regularly.

Various decisions in an organization are based on information and data in a system or systems of records. Thus, high quality data is critical for effective analysis. In some cases, a large amount of data both within and outside of an organization may be used for decision-making Increasing complexity and diversity of this at a emphasizes the need for deployment of data quality servicing frameworks such as those described herein. Organizations have a need for measuring and integrating data quality into existing applications and workflows. Data quality tools can be used to drive operational improvements while making it easy to manage exceptions, thus simplifying and increasing efficiency in managing IT infrastructure.

There are a number of challenges associated with data quality servicing. For example, data gathering from different systems may require a lot of effort, including tedious work. Managing different layers ITIL information and managing relationship data is also a never-ending task. People or personnel changes can also present issues, as new personnel coming into and going out of an organization, or personnel being promoted or changing roles, requires respective systems to be updated with new, correct information for better accountability. Organizational changes, such as mergers and acquisitions, structural changes within IT and business units, etc. can also make it difficult to re-map enterprise data for trend analysis. Capturing demand data is another challenge, as a lack of process maturity can prevent capturing all of the demand data such as projects, work requests, changes, deployments, incidents, etc.

Another challenge is in capturing labor effort. For example, timesheet submission by employees and contractors may not always be 100% on-time. Ensuring that timesheet data or other tracking of labor effort maps to respective demand or work, applications, products or services also may not be fully accurate. Besides this, there may be some aspects of labor effort which are difficult to classify, such as part-time consultants, students, etc., including whether the effort even needs to be captured for these and other people or personnel.

Consumption data is an important component of an IT cost transparency model. For cost transparency, it is often difficult and complex to capture precise utilization of various IT applications, platforms and other IT resources. IT resources may also be shared among multiple business units or data consumers, further complicating the allocation of IT costs for an IT cost transparency model. Cost regions are another challenge, in that cost may vary depending on the location from which services are provided. Cost should be allocated evenly or fairly considering or depending on where services are consumed.

Automated data quality governance using data quality servicing frameworks described herein provides a number of advantages, including providing for cost recovery by reducing unallocated costs associated with IT resource utilization. Data quality servicing frameworks can further be used to unleash powerful competitive advantages that can be leveraged indefinitely.

Figure 9:
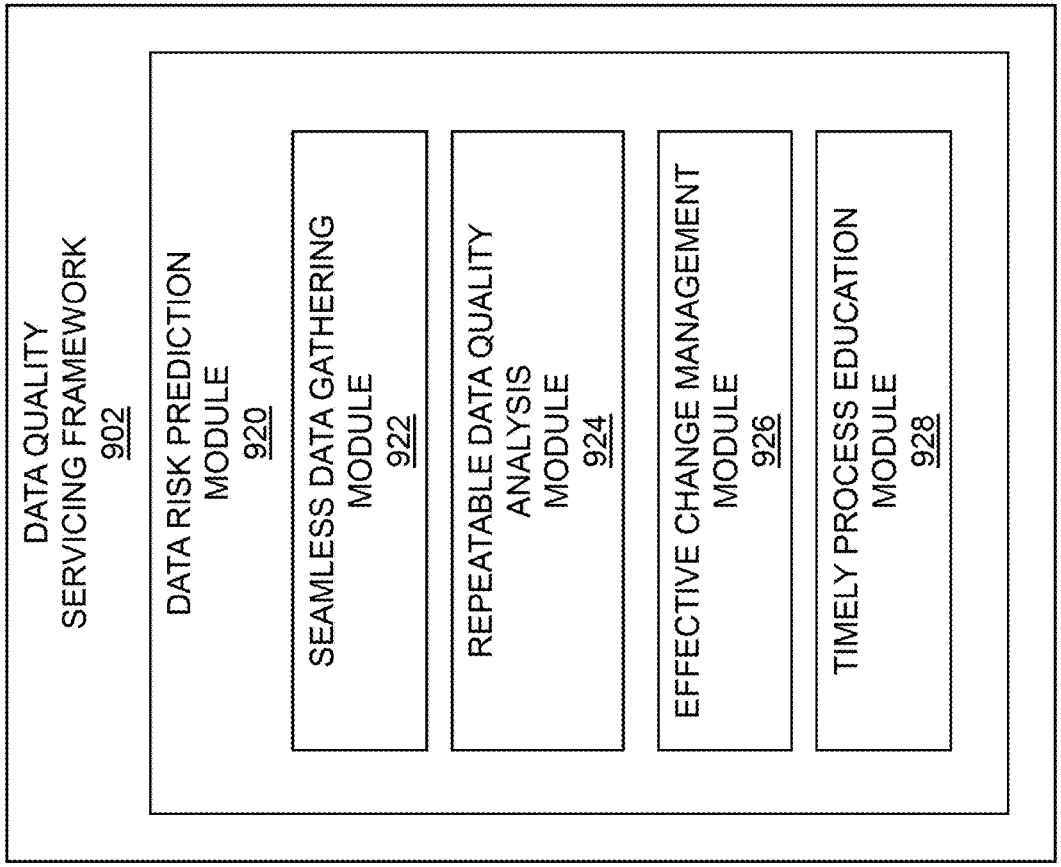
FIG. 9 is a block diagram of automated data governance in an illustrative embodiment.

FIG. 9 shows an illustration of a data quality servicing framework 902 providing data risk prediction module 920 through functionality provided by seamless data gathering in module 922, repeatable data quality analysis in module 924, effective change management in module 926 and timely process education in module 928.

Seamless data gathering module 922 provides systematic storage and management of data quality rules controlling storage of IT resource utilization data in a system or systems of records. The data quality rules may be defined top-down or bottom-up and then communicated to an organization. The data quality rules provide for automation of tasks for improving data quality in IT functions and processes to act on appropriate data fixes at the time of data collection and storage. Such approaches can reduce overhead on the chain of command in an organization, and thus help to have personnel such as managers and executives focus their time on valuable work rather than having to be involved in repeated administrative tasks.

Repeatable data quality analysis module 924 provides automated data quality servicing, saving time and effort in data gathering from various systems and improving the quality of analysis. Data quality rules further help to analyze data discrepancies consistently in a repeatable manner.

Effective change management module 926 also reflects the effect of data quality rules, as data quality issues resulting from changes in IT infrastructure or an organization managing the IT infrastructure are handled automatically to detect such changes and implement appropriate data fixes quickly and efficiently.

Timely process education module 928 brings agility to the IT infrastructure or IT organization managing the IT infrastructure through appropriate notification and reporting as described herein.

The modules 922, 924, 926 and 928 may collectively provide functionality of the predictable data risk module 920. Benefits of automated governance are not limited to cost transparency (e.g., in reducing unallocated costs associated with IT resource utilization). Automated governance helps to synchronize master data that is maintained in different systems, helps to conduct compliance and data integrity checks for enterprise data, helps business intelligence systems to receive good data for analytics, and reduces time and effort in various phases of six sigma projects on operational efficiency improvement. Thus, embodiments bring competitive advantages resulting from more efficient use of IT resources.

It is to be appreciated that the particular advantages described above and elsewhere herein are associated with particular illustrative embodiments and need not be present in other embodiments.

Also, the particular types of information processing system features and functionality as illustrated in the drawings and described above are exemplary only, and numerous alternative arrangements may be used in other embodiments.

The information processing systems disclosed herein are illustratively implemented using one or more processing platforms, examples of which will be now be described in greater detail. A given such processing platform comprises at least one processing device comprising a processor coupled to a memory.

As mentioned previously, portions of an information processing system as disclosed herein illustratively comprise cloud infrastructure. The cloud infrastructure in some embodiments comprises a plurality of containers implemented using container host devices and may additionally or alternatively comprise other types of virtual resources such as virtual machines implemented using a hypervisor. Such cloud infrastructure can therefore be used to provide what is also referred to herein as a cloud computing environment. A given cloud computing environment may but need not accommodate multiple tenants.

The cloud infrastructure mentioned above may represent at least a portion of one processing platform. Another example of such a processing platform is a plurality of processing devices which communicate with one another over a network. Each such processing device comprises at least one processor coupled to at least one memory. The processor and memory in some embodiments comprise respective processor and memory elements of a virtual machine or container provided using one or more underlying physical machines. The term "processing device" as used herein is intended to be broadly construed so as to encompass a wide variety of different arrangements of physical processors, memories and other device components as well as virtual instances of such components. For example, a "processing device" in some embodiments can comprise or be executed across one or more virtual processors. Processing devices can therefore be physical or virtual and can be executed across one or more physical or virtual processors. It should also be noted that a given virtual device can be mapped to a portion of a physical one.

Some illustrative embodiments of a processing platform that may be used to implement at least a portion of an information processing system comprise cloud infrastructure including virtual machines implemented using a hypervisor that runs on physical infrastructure. The cloud infrastructure further comprises sets of applications running on respective ones of the virtual machines under the control of the hypervisor. It is also possible to use multiple hypervisors each providing a set of virtual machines using at least one underlying physical machine. Different sets of virtual machines provided by one or more hypervisors may be utilized in configuring multiple instances of various components of the system.

These and other types of cloud infrastructure can be used to provide what is also referred to herein as a multi-tenant environment.

Cloud infrastructure as disclosed herein can include cloud-based systems such as an Amazon Web Services (AWS) system. Other examples of cloud-based systems that can be used to implement at least portions of system 100 include Google Cloud Platform (GCP) and Microsoft Azure. The cloud-based systems can include object stores such as Amazon S3, GCP Cloud Storage, and Microsoft Azure Blob Storage.

In some embodiments, the cloud infrastructure additionally or alternatively comprises a plurality of containers implemented using container host devices. For example, a given container of cloud infrastructure illustratively comprises a Docker container or other type of Linux container (LXC). The containers may run on virtual machines in a multi-tenant environment, although other arrangements are possible. The containers may be utilized to implement a variety of different types of functionality within the system 100. For example, containers can be used to implement respective processing devices providing compute services of a cloud-based system. Again, containers may be used in combination with other virtualization infrastructure such as virtual machines implemented using a hypervisor.

Illustrative embodiments of processing platforms will now be described in greater detail with reference to FIGS. 10 and 11. Although described in the context of system 100, these platforms may also be used to implement at least portions of other information processing systems in other embodiments.

Figure 10:
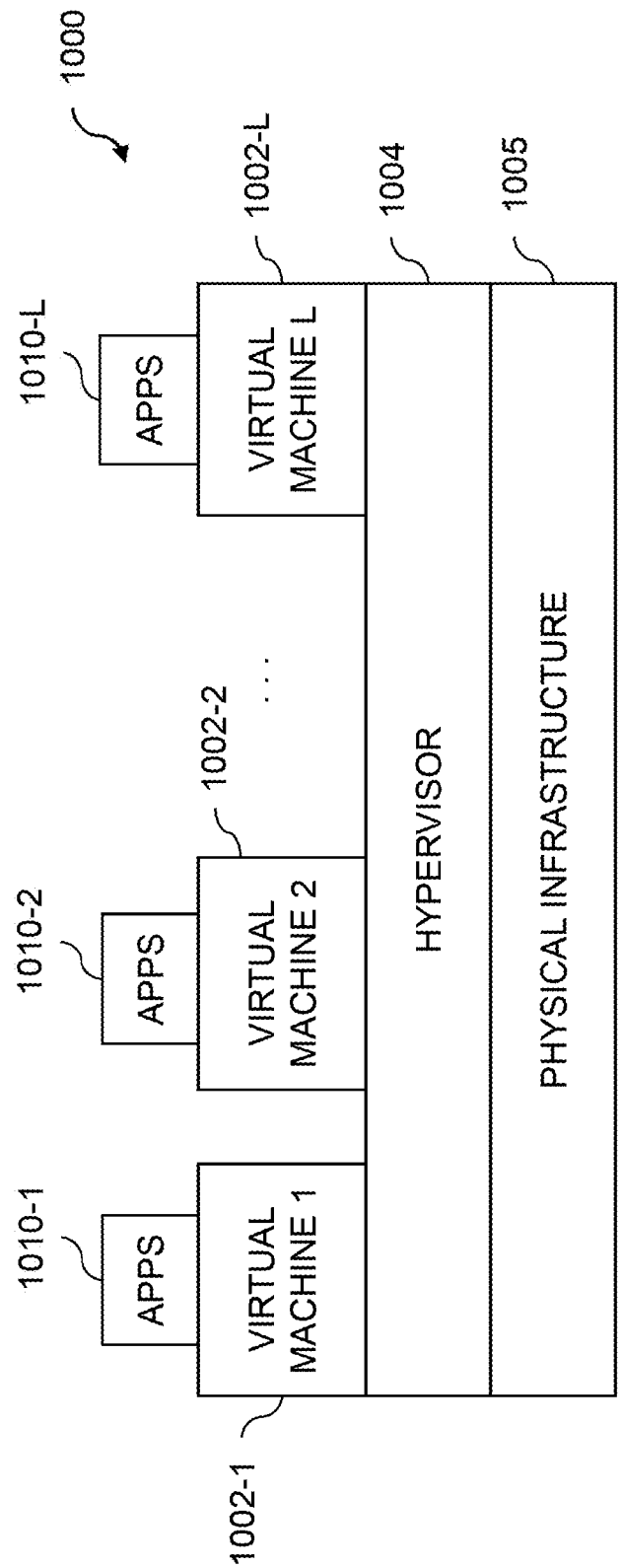
FIGS. 10 and 11 show examples of processing platforms that may be utilized to implement at least a portion of the FIG. 1 system.
Figure 11:
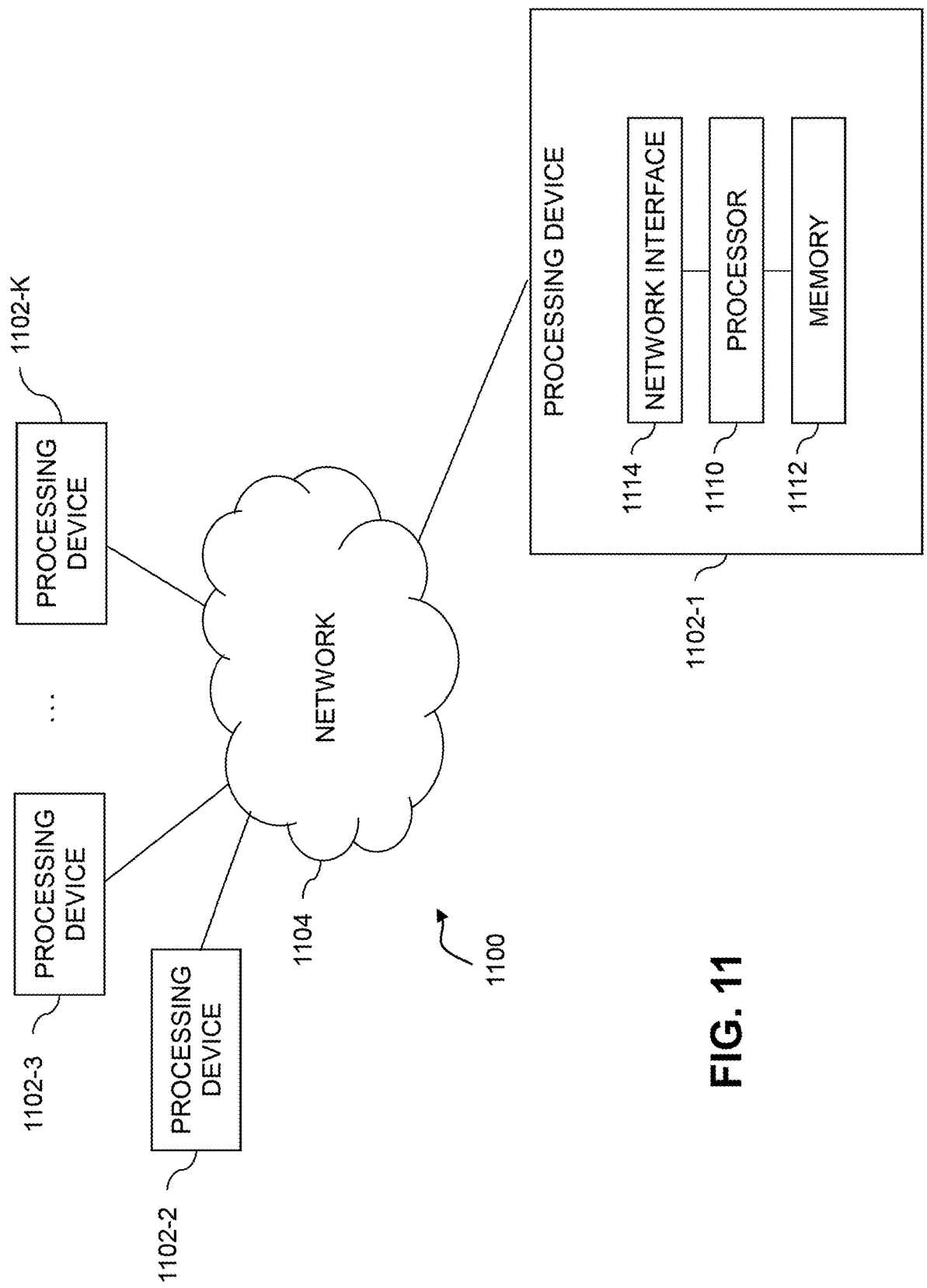

FIG. 10 shows an example processing platform comprising cloud infrastructure 1000. The cloud infrastructure 1000 comprises a combination of physical and virtual processing resources that may be utilized to implement at least a portion of the information processing system 100. The cloud infrastructure 1000 comprises virtual machines (VMs) 1002-1, 1002-2, . . . 1002-L implemented using a hypervisor 1004. The hypervisor 1004 runs on physical infrastructure 1005. The cloud infrastructure 1000 further comprises sets of applications 1010-1, 1010-2, . . . 1010-L running on respective ones of the virtual machines 1002-1, 1002-2, . . . 1002-L under the control of the hypervisor 1004.

Although only a single hypervisor 1004 is shown in the embodiment of FIG. 10, the system 100 may of course include multiple hypervisors each providing a set of virtual machines using at least one underlying physical machine. Different sets of virtual machines provided by one or more hypervisors may be utilized in configuring multiple instances of various components of the system 100.

An example of a hypervisor platform that may be used to implement hypervisor 1004 and possibly other portions of the information processing system 100 in one or more embodiments is the VMware® vSphere® which may have an associated virtual infrastructure management system such as the VMware® vCenter™. The underlying physical machines may comprise one or more distributed processing platforms that include one or more storage systems.

Such storage systems can comprise any of a variety of different types of storage including network-attached storage (NAS), storage area networks (SANs), direct-attached storage (DAS) and distributed DAS, as well as combinations of these and other storage types, including software-defined storage.

Particular types of storage products that can be used in implementing a given storage system in an illustrative embodiment include VNX® and Symmetrix VMAX® storage arrays, software-defined storage products such as ScaleIO™ and ViPR®, flash-based storage arrays such as DSSD™, cloud storage products such as Elastic Cloud Storage (ECS), object-based storage products such as Atmos®, scale-out all-flash storage arrays such as XtremIO™, and scale-out NAS clusters comprising Isilon® platform nodes and associated accelerators in the S-Series, X-Series and NL-Series product lines, all from Dell EMC. Combinations of multiple ones of these and other storage products can also be used in implementing a given storage system in an illustrative embodiment.

As is apparent from the above, one or more of the processing modules or other components of system 100 may each run on a computer, server, storage device or other processing platform element. A given such element may be viewed as an example of what is more generally referred to herein as a "processing device." The cloud infrastructure 1000 shown in FIG. 10 may represent at least a portion of one processing platform. Another example of such a processing platform is processing platform 1100 shown in FIG. 11.

The processing platform 1100 in this embodiment comprises a portion of system 100 and includes a plurality of processing devices, denoted 1102-1, 1102-2, 1102-3, . . . 1102-K, which communicate with one another over a network 1104.

The network 1104 may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

The processing device 1102-1 in the processing platform 1100 comprises a processor 1110 coupled to a memory 1112.

The processor 1110 may comprise a microprocessor, a microcontroller, an application-specific integrated circuit (ASIC), a field-programmable gate array (FPGA) or other type of processing circuitry, as well as portions or combinations of such circuitry elements.

The memory 1112 may comprise random access memory (RAM), read-only memory (ROM) or other types of memory, in any combination. The memory 1112 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 1102-1 is network interface circuitry 1114, which is used to interface the processing device with the network 1104 and other system components, and may comprise conventional transceivers.

The other processing devices 1102 of the processing platform 1100 are assumed to be configured in a manner similar to that shown for processing device 1102-1 in the figure.

Again, the particular processing platform 1100 shown in the figure is presented by way of example only, and system 100 may include additional or alternative processing platforms, as well as numerous distinct processing platforms in any combination, with each such platform comprising one or more computers, servers, storage devices or other processing devices.

For example, other processing platforms used to implement illustrative embodiments can comprise different types of virtualization infrastructure, in place of or in addition to virtualization infrastructure comprising virtual machines. Such virtualization infrastructure illustratively includes container-based virtualization infrastructure configured to provide Docker containers or other types of LXCs.

As another example, portions of a given processing platform in some embodiments can comprise converged infrastructure such as VxRail™, VxRack™, VxRack™ FLEX, VxBlock™, or Vblock® converged infrastructure from VCE, the Virtual Computing Environment Company, now the Converged Platform and Solutions Division of Dell EMC.

These and numerous other alternative cloud computing environments or other types of processing platforms can be configured to implement functionality for managing data quality as disclosed herein.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage devices or other components are possible in the information processing system 100. Such components can communicate with other elements of the information processing system 100 over any type of network or other communication media.

As indicated previously, components of an information processing system as disclosed herein can be implemented at least in part in the form of one or more software programs stored in memory and executed by a processor of a processing device. For example, at least portions of the functionality described herein for data quality management are illustratively implemented in the form of software running on one or more processing devices.

It should again be emphasized that the above-described embodiments are presented for purposes of illustration only. Many variations and other alternative embodiments may be used. For example, the disclosed techniques are applicable to a wide variety of other types of information processing systems in which it is desirable to provide the data quality management functionality described herein. Also, the particular configurations of system and device elements shown in the figures can be varied in other embodiments. Thus, for example, the particular type of software modules deployed in a given embodiment and their respective configurations may be varied. Other features of the illustrative embodiments can also be varied. Moreover, the various assumptions made above in the course of describing the illustrative embodiments should also be viewed as exemplary rather than as requirements or limitations. Numerous other alternative embodiments within the scope of the appended claims will be readily apparent to those skilled in the art.

What is claimed is:

1. A method comprising:
   determining two or more storage systems storing information technology (IT) resource utilization data for an IT infrastructure;
   establishing a set of data quality rules for controlling storage of the IT resource utilization data in the one or more storage systems to reduce unallocated IT resource utilization;
   analyzing the IT resource utilization data stored in the two or more storage systems to detect data discrepancies affecting allocation of IT resource utilization among a plurality of users of IT resources of the IT infrastructure, a given one of the data discrepancies resulting in at least a portion of the IT resource utilization, by a first one of the plurality of users during a given period of time, at least one of (i) being allocated to at least a second one of the plurality of users for the given period of time and (ii) not being allocated to any of the plurality of users for the given period of time;
   adjusting the IT resource utilization data stored in at least one of the two or more storage systems to remedy the given data discrepancy associated with the IT resource utilization data; and
   modifying the set of data quality rules for controlling storage of the IT resource utilization data in the two or more storage systems to prevent the given data discrepancy from occurring on subsequent storage of the IT resource utilization data in the two or more storage systems;
   wherein the IT resource utilization by the first user during the given period of time is characterized by (i) information associated with one or more IT services consumed by the first user during the given period of time, (ii) information associated with one or more IT software resources and IT hardware resources used to provision the one or more IT services consumed by the first user during the given period of time, and (iii) information associated with operating the one or more IT software resources and IT hardware resources in the IT infrastructure during the given period of time;
   wherein detecting the given data discrepancy comprises:
   identifying first and second ones of the two or more storage systems comprising first and second data sources providing first and second data sets that are combined to provide at least a portion of the information associated with operating the one or more IT software resources and IT hardware resources in the IT infrastructure during the given period of time; and determining that first information in the first data set associated with operating a given one of the one or more IT software resources and IT hardware resources in the IT infrastructure during the given period of time is at least a partial duplicate of second information in the second data set associated with operating the given one of the one or more IT software resources and IT hardware resources in the IT infrastructure during the given period of time;

wherein the method is performed by at least one processing device comprising a processor coupled to a memory.

2. The method of claim 1 further comprising generating data profiles for one or more data domains, the data profiles characterizing quality of data in the one or more data domains, the set of data quality rules comprising rules governing storage of the data in the one or more data domains.

3. The method of claim 2 wherein generating the data profiles comprises:
determining a scope of a given IT function or process;
identifying data sources in the two or more storage systems utilized by the given IT function or process;
determining input and output data formats for the given IT function or process; and
identifying computations and associated data fields for generating measures of utilization of the IT resources by the given IT function or process.

4. The method of claim 2 wherein generating the data profiles comprises:
identifying, in at least one of the two or more storage systems, one or more tables and data fields and associated data types and sizes of the identified tables and data fields;
analyzing data objects in the identified data fields to determine size, volume and usage history;
identifying at least one of counts of and percentage of rows in the identified tables with null data and unique data for one or more specified data fields;
analyzing one or more characteristics of the identified data fields, the one or more characteristics comprising at least one of minimum value, maximum value, average value and standard deviation; and
utilizing the determined size, volume and usage history, the counts, the percentages, and the one or more characteristics to determine one or more of the data fields utilized by a given IT function or process for generating measures of utilization of the IT resources by the given IT function or process.

5. The method of claim 1 wherein the data quality rules comprise at least one of:
one or more rules for maintaining an IT service catalog mapping IT services to underlying ones of the one or more IT hardware resources and the one or more IT software resources in the IT infrastructure;
one or more rules for maintaining IT software data, including categorizing IT software, maintaining a database inventory of IT software, establishing demand tracking within IT software, and standardizing name, classification and status of IT software information across different data consumers; and
one or more rules for maintaining IT hardware data, including categorizing IT hardware, maintaining a database inventory of IT hardware, maintaining relationships between IT hardware components, and maintaining relationships between IT hardware components and IT software in the IT infrastructure.

6. The method of claim 1 wherein the data quality rules comprise at least one of:
one or more rules for maintaining organization structure information, including an internal IT structure of an organization utilizing the IT infrastructure;
one or more rules for maintaining a register of capital assets and mapping capital assets to the one or more IT hardware resources and the one or more IT software resources in the IT infrastructure; and
one or more rules for maintaining licensing costs mapped to the one or more IT hardware resources and the one or more IT software resources in the IT infrastructure.

7. The method of claim 1 wherein the data quality rules comprise one or more rules for logging labor effort mapped to appropriate tasks and ones of the one or more IT hardware resources and one or more IT software resources in the IT infrastructure.

8. The method of claim 1 wherein analyzing the IT resource utilization data stored in the two or more storage systems to detect the given data discrepancy comprises comparing the first data set from the first data source with the second data set from the second data source to identify:
one or more data fields available from the first data source that are missing from the second data source;
one or more data fields available from the second data source that are missing from the first data source; and
one or more data fields that have different attributes in the first data source and the second data source.

9. The method of claim 1 wherein analyzing the IT resource utilization data stored in the two or more storage systems to detect the given data discrepancy comprises analyzing the first and second data sets from the first and second data sources to identify:
one or more data values outside a designated range for a given data field;
one or more data values having a null value; and
functional data having values within or outside one or more specifications.

10. The method of claim 1 further comprising, responsive to detecting the given data discrepancy:
identifying at least one of the first and second data sets stored in the first and second storage systems as a given data source responsible for the given data discrepancy;
identifying an entity responsible for managing the given data source;
generating a notification detailing the given data discrepancy; and
providing the notification to the identified responsible entity.

11. The method of claim 1 wherein adjusting the IT resource utilization data stored in one or more of the storage systems to remedy the given data discrepancy associated with the IT resource utilization data comprises:
identifying at least one of the first and second data sets stored in the first and second storage systems as a given data source responsible for the given data discrepancy; and
fixing the given data discrepancy at the given data source prior to transfer of said at least one of the first and second data sets to one or more data consumers.

12. The method of claim 1 wherein modifying the set of data quality rules for controlling storage of the IT resource utilization data in the two or more storage systems to prevent the given data discrepancy from occurring on subsequent storage of the IT resource utilization data in the two or more storage systems comprises implementing at least one data quality check to validate new data for the first and second data sets having the given data discrepancy prior to storage of the new data for the first and second data sets in the two or more storage systems.

13. The method of claim 1 wherein modifying the set of data quality rules for controlling storage of the IT resource utilization data in the two or more storage systems to prevent the given data discrepancy from occurring on subsequent storage of the IT resource utilization data in the two or more storage systems comprises adjusting one or more IT processes and functions that store new data for the first and second data sets having the given data discrepancy.

14. The method of claim 13, wherein adjusting one or more of the IT processes and functions comprises at least one of:
  combining two or more IT processes and functions which store new data for the first and second data sets; and
  automating data flow between two or more of the IT processes and functions which store new data for the first and second data sets.

15. The method of claim 1 further comprising:
  generating a report characterizing data quality trends based on analyzing the IT resource utilization data stored in the two or more storage systems over a designated time period; and
  providing, over at least one network to a client device of a user responsible for managing at least a portion of the IT infrastructure, the report characterizing the data quality trends over the designated time period;
  wherein the report comprises one or more views of the data quality trends separated by at least one of a data domain, a data owner and an underlying IT process.

16. The method of claim 15 further comprising utilizing the report characterizing the data quality trends to estimate an accuracy of IT resource utilization by determining unallocated IT resource utilization.

17. A computer program product comprising a non-transitory processor-readable storage medium having stored therein program code of one or more software programs, wherein the program code when executed by at least one processing device cause the at least one processing device:
  to determine two or more storage systems storing information technology (IT) resource utilization data for an IT infrastructure;
  to establish a set of data quality rules for controlling storage of the IT resource utilization data in the two or more storage systems to reduce unallocated IT resource utilization;
  to analyze the IT resource utilization data stored in the two or more storage systems to detect data discrepancies affecting allocation of IT resource utilization among a plurality of users of IT resources of the IT infrastructure, a given one of the data discrepancies resulting in at least a portion of the IT resource utilization, by a first one of the plurality of users during a given period of time, at least one of (i) being allocated to at least a second one of the plurality of users for the given period of time and (ii) not being allocated to any of the plurality of users for the given period of time;
  to adjust the IT resource utilization data stored in at least one of the two or more storage systems to remedy the given data discrepancy associated with the IT resource utilization data; and
  to modify the set of data quality rules for controlling storage of the IT resource utilization data in the two or more storage systems to prevent the given data discrepancy from occurring on subsequent storage of the IT resource utilization data in the two or more storage systems;
  wherein the IT resource utilization by the first user during the given period of time is characterized by (i) information associated with one or more IT services consumed by the first user during the given period of time, (ii) information associated with one or more IT software resources and IT hardware resources used to provision the one or more IT services consumed by the first user during the given period of time, and (iii) information associated with operating the one or more IT software resources and IT hardware resources in the IT infrastructure during the given period of time; and
  wherein detecting the given data discrepancy comprises:
    identifying first and second ones of the two or more storage systems comprising first and second data sources providing first and second data sets that are combined to provide at least a portion of the information associated with operating the one or more IT software resources and IT hardware resources in the IT infrastructure during the given period of time; and
    determining that first information in the first data set associated with operating a given one of the one or more IT software resources and IT hardware resources in the IT infrastructure during the given period of time is at least a partial duplicate of second information in the second data set associated with operating the given one of the one or more IT software resources and IT hardware resources in the IT infrastructure during the given period of time.

18. The computer program product of claim 17 wherein analyzing the IT resource utilization data stored in the two or more storage systems to detect the given data discrepancy comprises comparing the first data set from the first data source with the second data set from the second data source to identify:
  one or more data fields available from the first data source that are missing from the second data source;
  one or more data fields available from the second data source that are missing from the first data source; and
  one or more data fields that have different attributes in the first data source and the second data source.

19. An apparatus comprising:
  at least one processing device comprising a processor coupled to a memory;
  the at least one processing device being configured to implement a controller configured:
    to determine two or more storage systems storing information technology (IT) resource utilization data for an IT infrastructure;
    to establish a set of data quality rules for controlling storage of the IT resource utilization data in the two or more storage systems to reduce unallocated IT resource utilization;
    to analyze the IT resource utilization data stored in the two or more storage systems to detect data discrepancies affecting allocation of IT resource utilization among a plurality of users of IT resources of the IT infrastructure, a given one of the data discrepancies resulting in at least a portion of the IT resource utilization, by a first one of the plurality of users during a given period of time, at least one of (i) being allocated to at least a second one of the plurality of users for the given period of time and (ii) not being allocated to any of the plurality of users for the given period of time;

to adjust the IT resource utilization data stored in at least one of the two or more storage systems to remedy the given data discrepancy associated with the IT resource utilization data; and to modify the set of data quality rules for controlling storage of the IT resource utilization data in the two or more storage systems to prevent the given data discrepancy from occurring on subsequent storage of the IT resource utilization data in the two or more storage systems;

wherein the IT resource utilization by the first user during the given period of time is characterized by (i) information associated with one or more IT services consumed by the first user during the given period of time, (ii) information associated with one or more IT software resources and IT hardware resources used to provision the one or more IT services consumed by the first user during the given period of time, and (iii) information associated with operating the one or more IT software resources and IT hardware resources in the IT infrastructure during the given period of time; and wherein detecting the given data discrepancy comprises:
identifying first and second ones of the two or more storage systems comprising first and second data sources providing first and second data sets that are combined to provide at least a portion of the information associated with operating the one or more IT software resources and IT hardware resources in the IT infrastructure during the given period of time; and determining that first information in the first data set associated with operating a given one of the one or more IT software resources and IT hardware resources in the IT infrastructure during the given period of time is at least a partial duplicate of second information in the second data set associated with operating the given one of the one or more IT software resources and IT hardware resources in the IT infrastructure during the given period of time.

20. The apparatus of claim 19 wherein analyzing the IT resource utilization data stored in the two or more storage systems to detect the given data discrepancy comprises comparing the first data set from the first data source with the second data set from the second data source to identify:

one or more data fields available from the first data source that are missing from the second data source;

one or more data fields available from the second data source that are missing from the first data source; and one or more data fields that have different attributes in the first data source and the second data source.

* * * * *